US012785222B2

(12) United States Patent
Choi et al.

(10) Patent No.: US 12,785,222 B2
(45) Date of Patent: Nov. 3, 2026

(54) SECONDARY BATTERY, AND BATTERY PACK AND VEHICLE COMPRISING SAME

(71) Applicant: LG ENERGY SOLUTION, LTD., Seoul (KR)

(72) Inventors: Suji Choi, Daejeon (KR); Do Gyun Kim, Daejeon (KR); Je Jun Lee, Daejeon (KR); Kwang Su Hwang Bo, Daejeon (KR); Geon Woo Min, Daejeon (KR); Minki Jo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 764 days.

(21) Appl. No.: 18/035,180

(22) PCT Filed: Feb. 18, 2022

(86) PCT No.: PCT/KR2022/002443
§ 371 (c)(1),
(2) Date: May 3, 2023

(87) PCT Pub. No.: WO2022/177360
PCT Pub. Date: Aug. 25, 2022

(65) Prior Publication Data

US 2024/0014521 A1 Jan. 11, 2024

(30) Foreign Application Priority Data

Feb. 19, 2021 (KR) ........................ 10-2021-0022865

(51) Int. Cl.
*H01M 50/538* (2021.01)
*H01M 10/04* (2006.01)
(Continued)

(52) U.S. Cl.
CPC ..... *H01M 50/538* (2021.01); *H01M 10/0431* (2013.01); *H01M 10/0587* (2013.01); *H01M 50/249* (2021.01); *H01M 2220/20* (2013.01)

(58) Field of Classification Search
CPC .................. B23K 2101/38; F16B 5/04; H01M 10/0431; H01M 50/107; H01M 50/213;
(Continued)

(56) References Cited

U.S. PATENT DOCUMENTS 6,677,082 B2 1/2004 Thackeray et al.
6,680,143 B2 1/2004 Thackeray et al.
(Continued)

FOREIGN PATENT DOCUMENTS

CN 102569706 A 7/2012
JP 10-340737 A 12/1998
(Continued)

OTHER PUBLICATIONS

Extended European Search Report for European Application No. 22756558.7, dated May 9, 2025.
(Continued)

*Primary Examiner* — Daniel S Gatewood
(74) *Attorney, Agent, or Firm* — Birch, Stewart, Kolasch & Birch, LLP

(57) ABSTRACT

A secondary battery includes an electrode assembly in which first and second electrodes and a separator provided between the first and second electrodes are wound, the first and second electrodes each including a non-coated portion, exposed to an outside of the separator, and having no active material applied thereto; and a current collecting plate provided at one end of the electrode assembly at which the non-coated portion of the first electrode is exposed, the current collecting plate including a central portion, and a peripheral portion provided around the central portion and
(Continued)

configured to adjoin one end of the electrode assembly, in which the peripheral portion includes one or more first through-holes penetrated by at least a part of the non-coated portion of the first electrode. A battery pack having a plurality of the secondary batteries and a vehicle having the battery pack are also provided.

17 Claims, 20 Drawing Sheets

(51) Int. Cl.
*H01M 10/0587* (2010.01)
*H01M 50/249* (2021.01)

(58) Field of Classification Search
CPC ............. H01M 50/528; H01M 50/531; H01M 50/533; H01M 50/536; H01M 50/538; H01M 50/567; H01M 2220/20; Y02E 60/10; Y02P 70/50
See application file for complete search history.

(56) References Cited

U.S. PATENT DOCUMENTS

| | | | | |
|---|---|---|---|---|
| 8,119,280 | B2 | 2/2012 | Gardner et al. | |
| 8,236,441 | B2 | 8/2012 | Gardner et al. | |
| 2004/0131930 | A1 | 7/2004 | Nakanishi et al. | |
| 2006/0019158 | A1* | 1/2006 | Mori | H01M 50/533 429/174 |
| 2009/0087733 | A1 | 4/2009 | Yoon et al. | |
| 2010/0216001 | A1* | 8/2010 | Byun | H01M 50/538 429/185 |
| 2012/0171555 | A1 | 7/2012 | Heo et al. | |
| 2012/0180308 | A1 | 7/2012 | Yamada et al. | |
| 2014/0017565 | A1 | 1/2014 | Byun et al. | |
| 2014/0308554 | A1 | 10/2014 | Khakhalev | |
| 2016/0049683 | A1 | 2/2016 | Cho | |
| 2017/0346064 | A1 | 11/2017 | Fukuoka et al. | |
| 2020/0235369 | A1 | 7/2020 | Jeong et al. | |
| 2022/0037747 | A1 | 2/2022 | Lee | |
| 2022/0149490 | A1* | 5/2022 | Takahashi | H01M 50/531 |

FOREIGN PATENT DOCUMENTS

| | | | | |
|---|---|---|---|---|
| JP | 2000-251871 | A | 9/2000 | |
| JP | 2001-176488 | A | 6/2001 | |
| JP | 2002-15732 | A | 1/2002 | |
| JP | 2005-108535 | A | 4/2005 | |
| JP | 2010-534916 | A | 11/2010 | |
| JP | WO2016/098291 | A1 | 6/2016 | |
| JP | 2018-37364 | A | 3/2018 | |
| KR | 10-0922352 | B1 | 10/2009 | |
| KR | 10-1023865 | B1 | 3/2011 | |
| KR | 10-1361193 | B1 | 2/2014 | |
| KR | 10-2015-0043016 | A | 4/2015 | |
| KR | 10-2019-0040699 | A | 4/2019 | |
| KR | 10-2020-0035739 | A | 4/2020 | |
| WO | WO 2011/036737 | A1 | 3/2011 | |
| WO | WO-2021024734 | A1 * | 2/2021 | H01M 50/538 |

OTHER PUBLICATIONS

Japanese Office Action for Japanese Application No. 2023-526481, dated Jul. 8, 2024, with English translation.
International Search Report (PCT/ISA/210) issued in PCT/KR2022/002443, dated Jun. 9, 2022.
Third Party Observation for European Application No. 22756558.7, dated Feb. 23, 2024.
Chinese Office Action for Chinese Application No. 202280007694.4, dated Aug. 29, 2026, with English translation.

* cited by examiner

[FIG. 1]
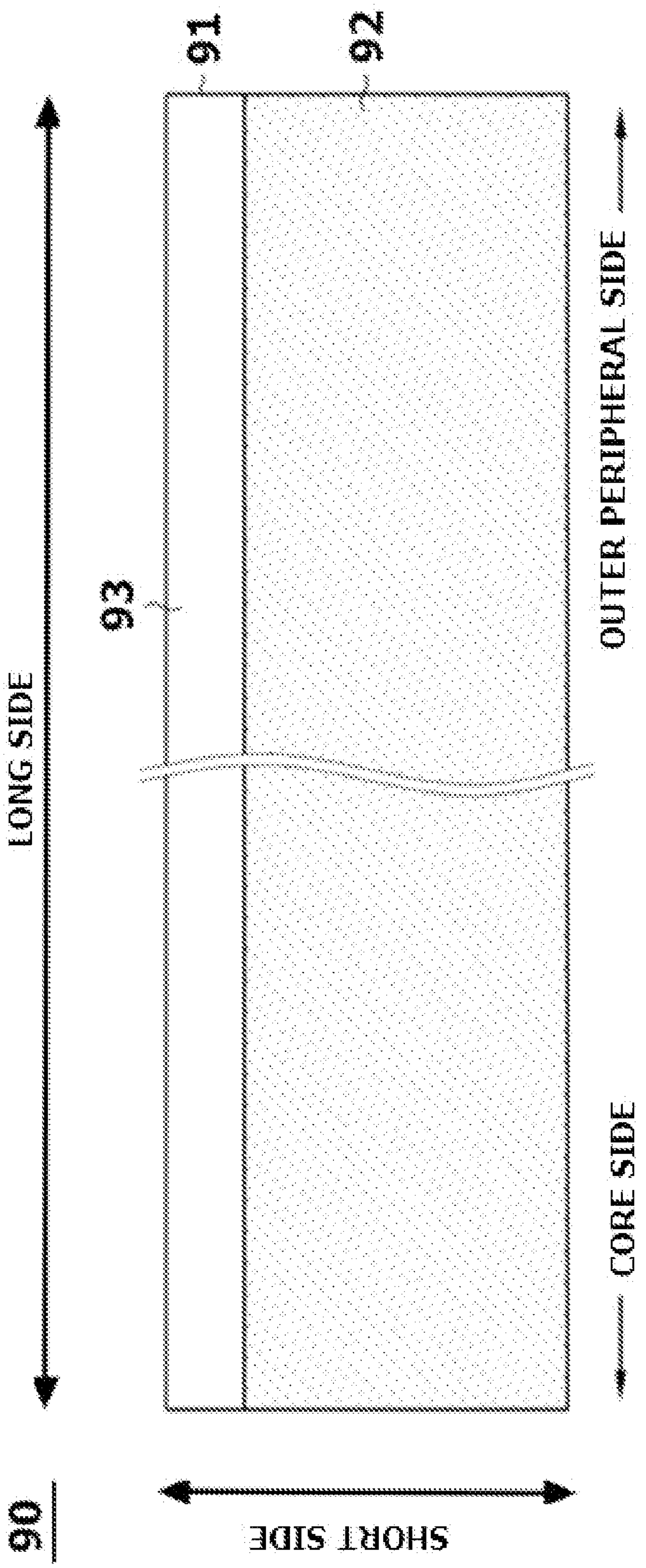

[FIG. 2]
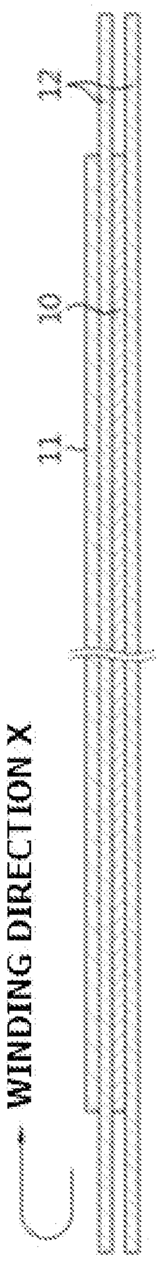

[FIG. 3]
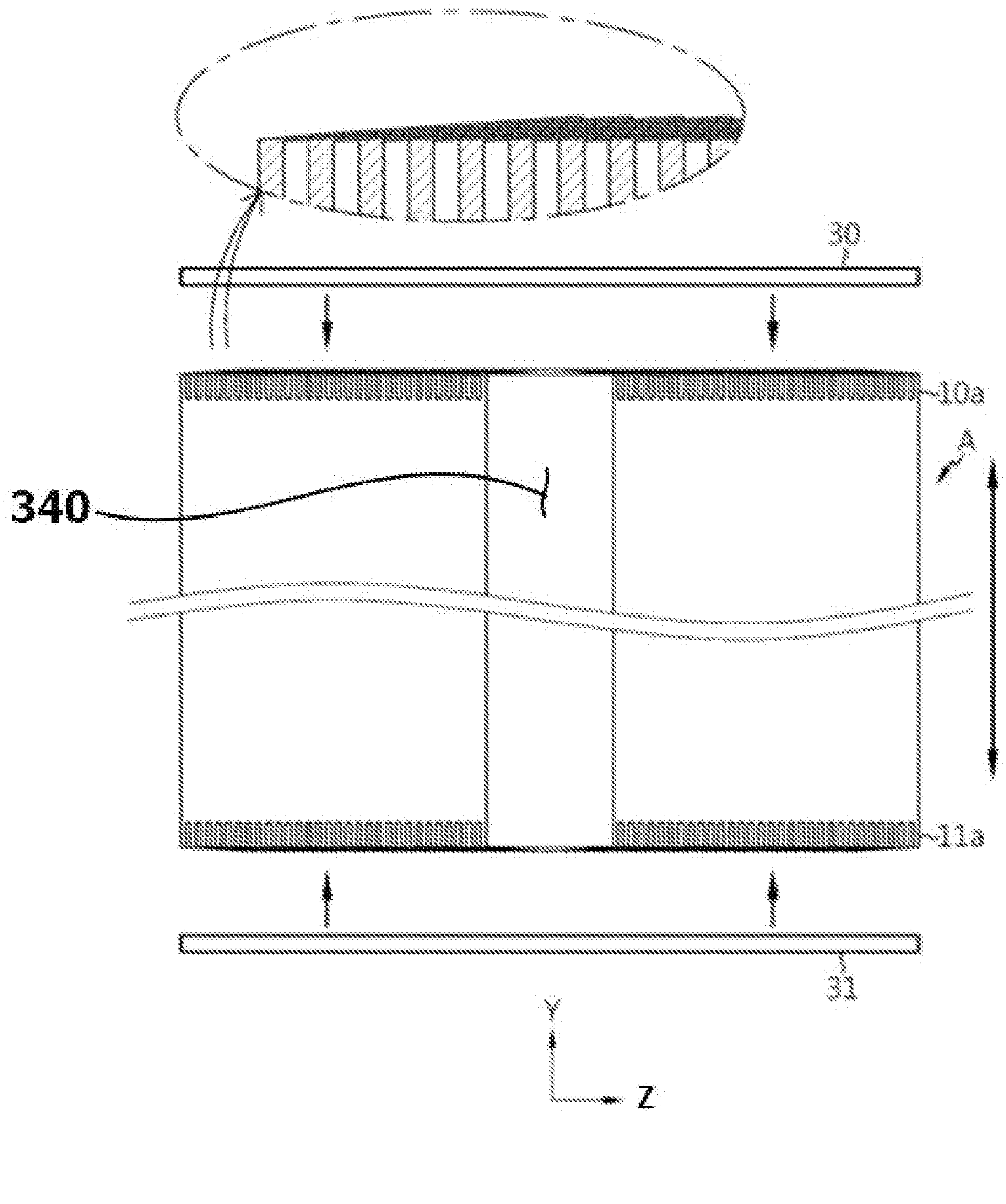

[FIG 4]
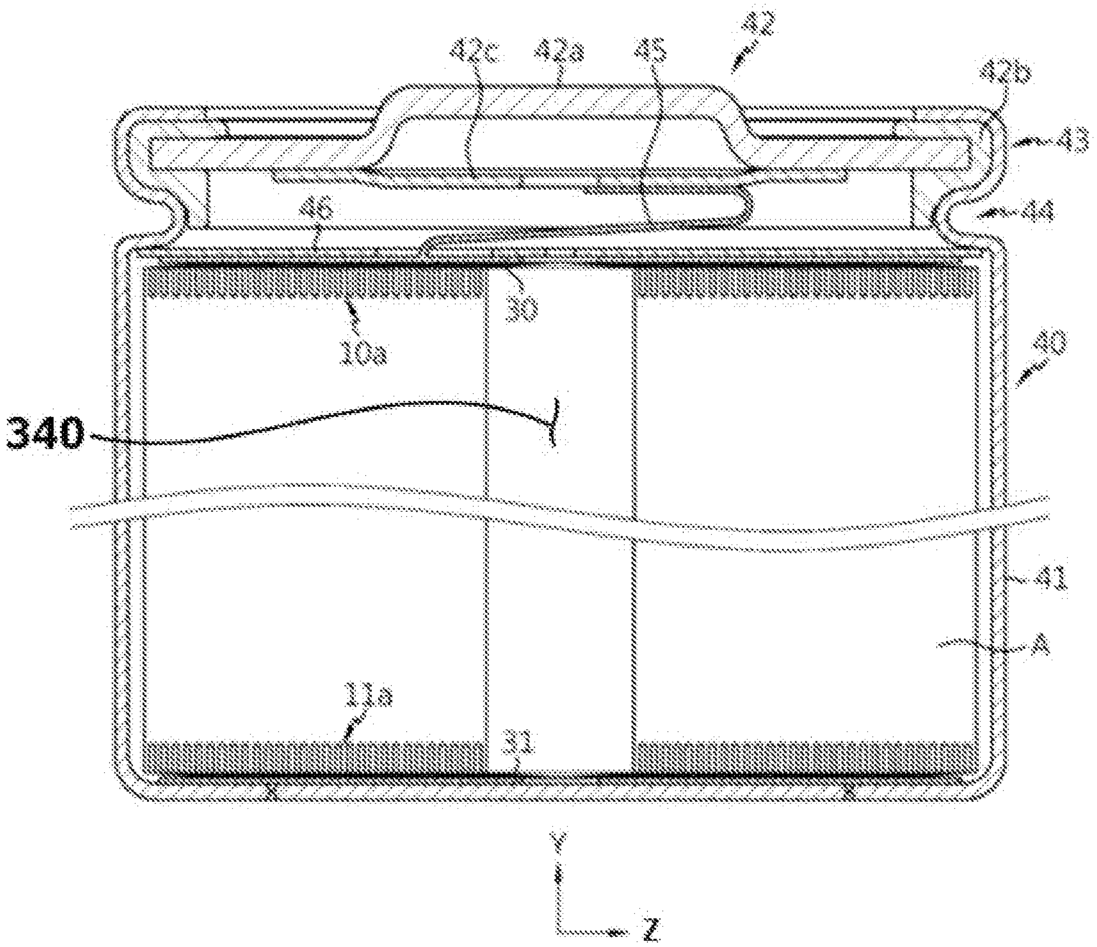

[FIG. 5]
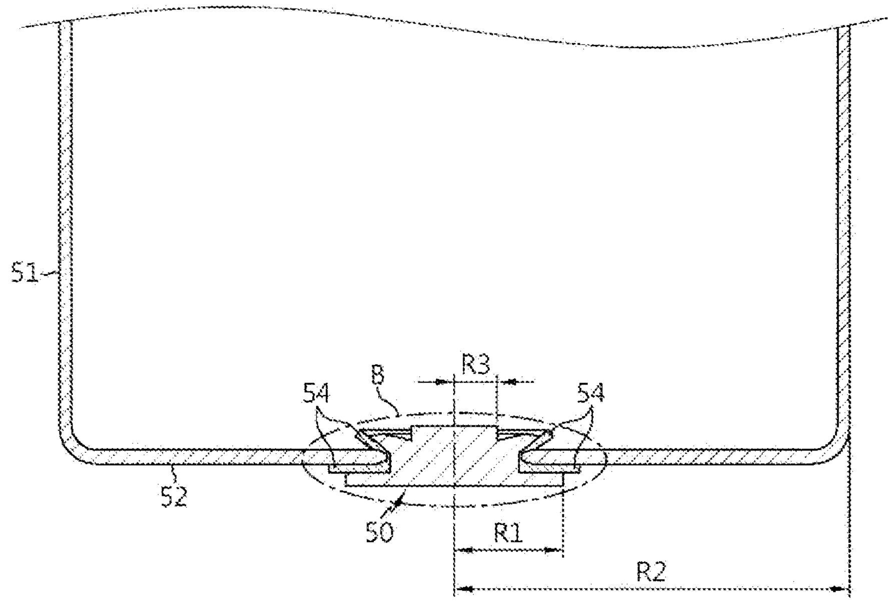
[FIG. 6]
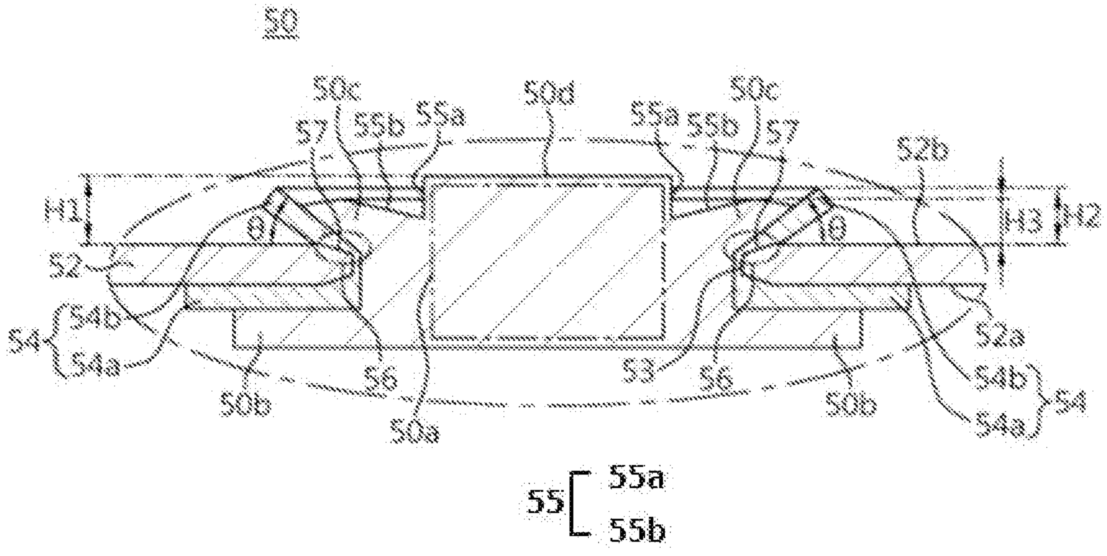

[FIG. 7]
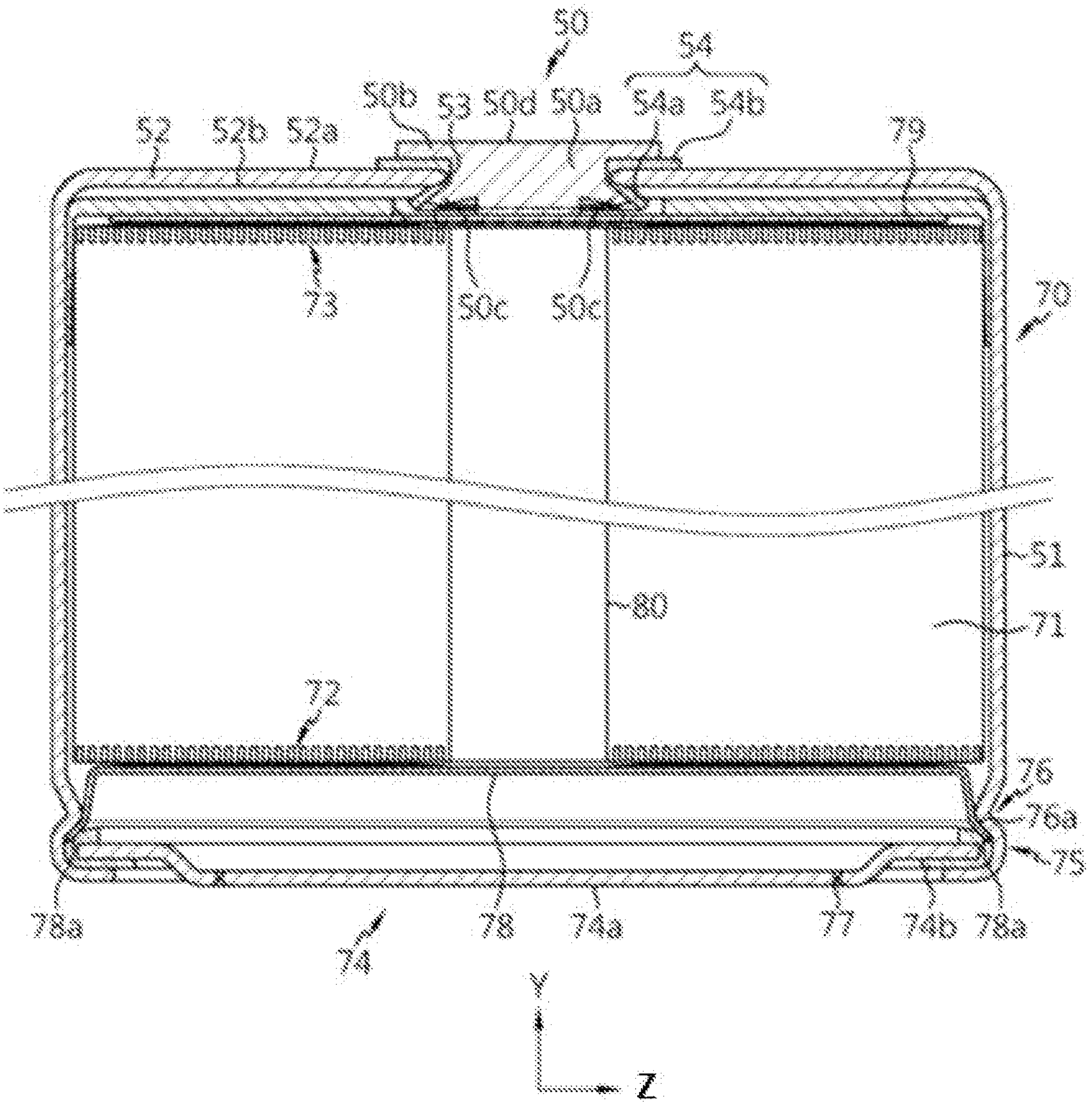
[FIG. 8]
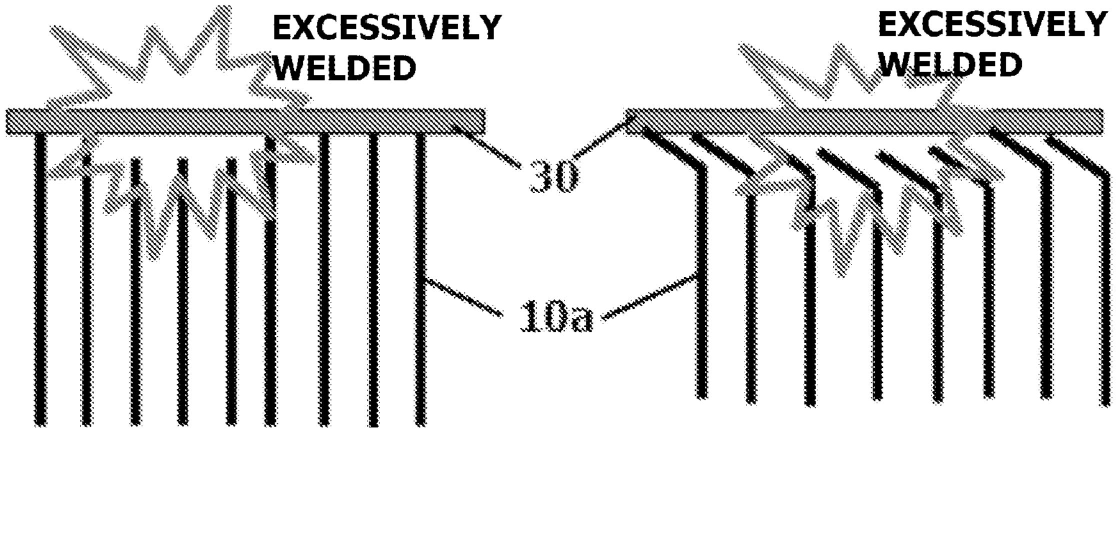

[FIG. 9]
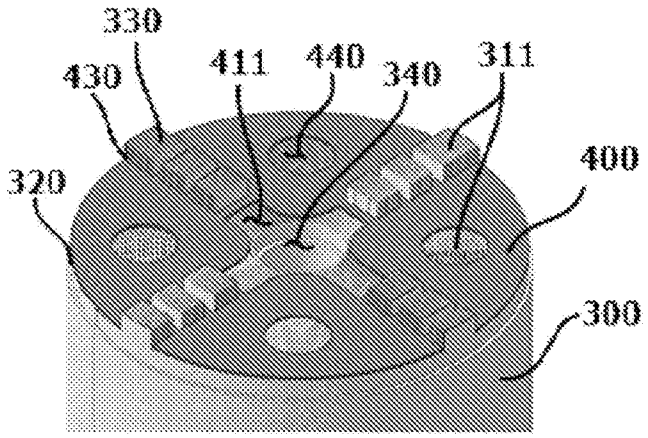
[FIG. 10]
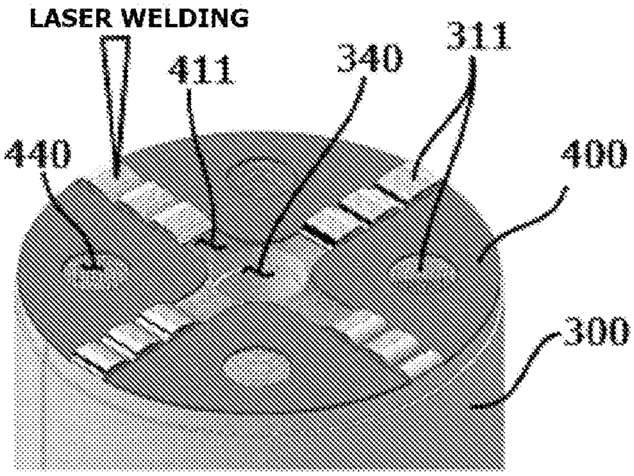

[FIG. 11]
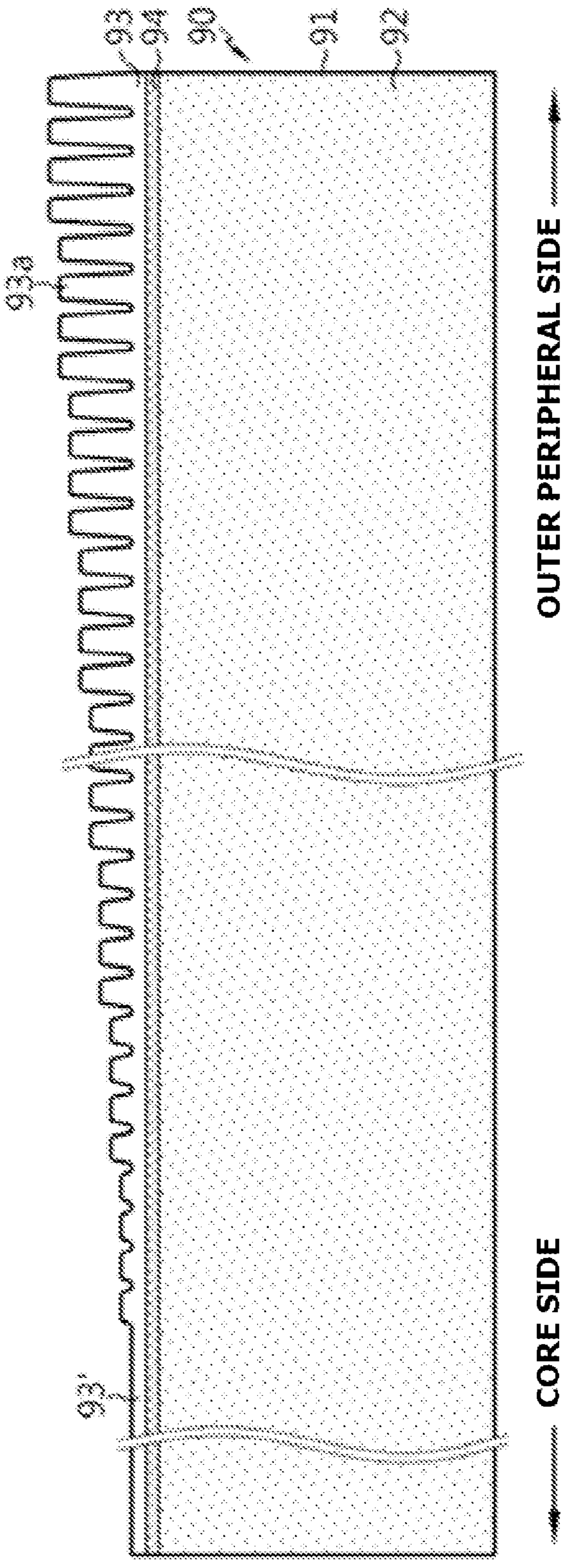

[FIG. 12]
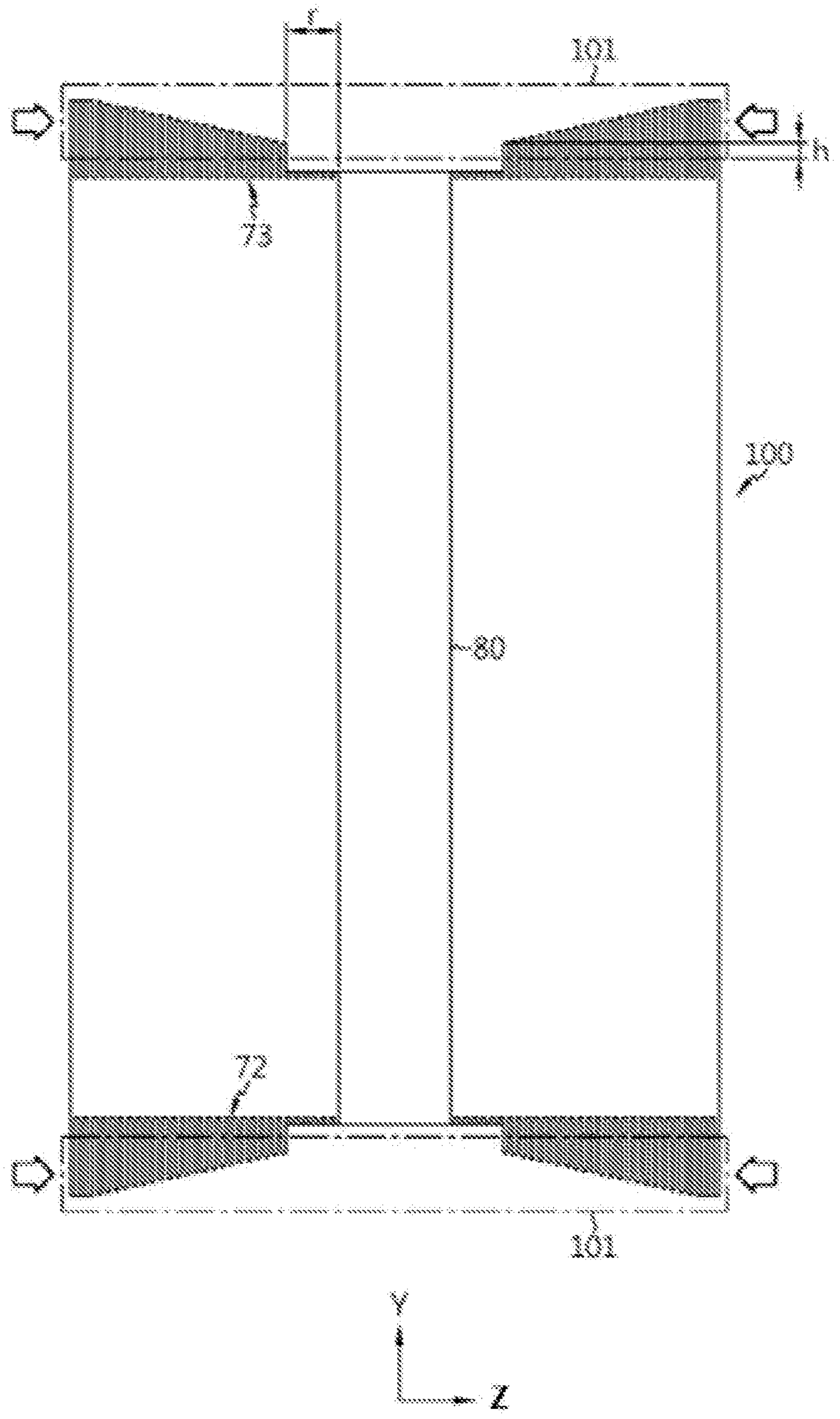

[FIG. 13]
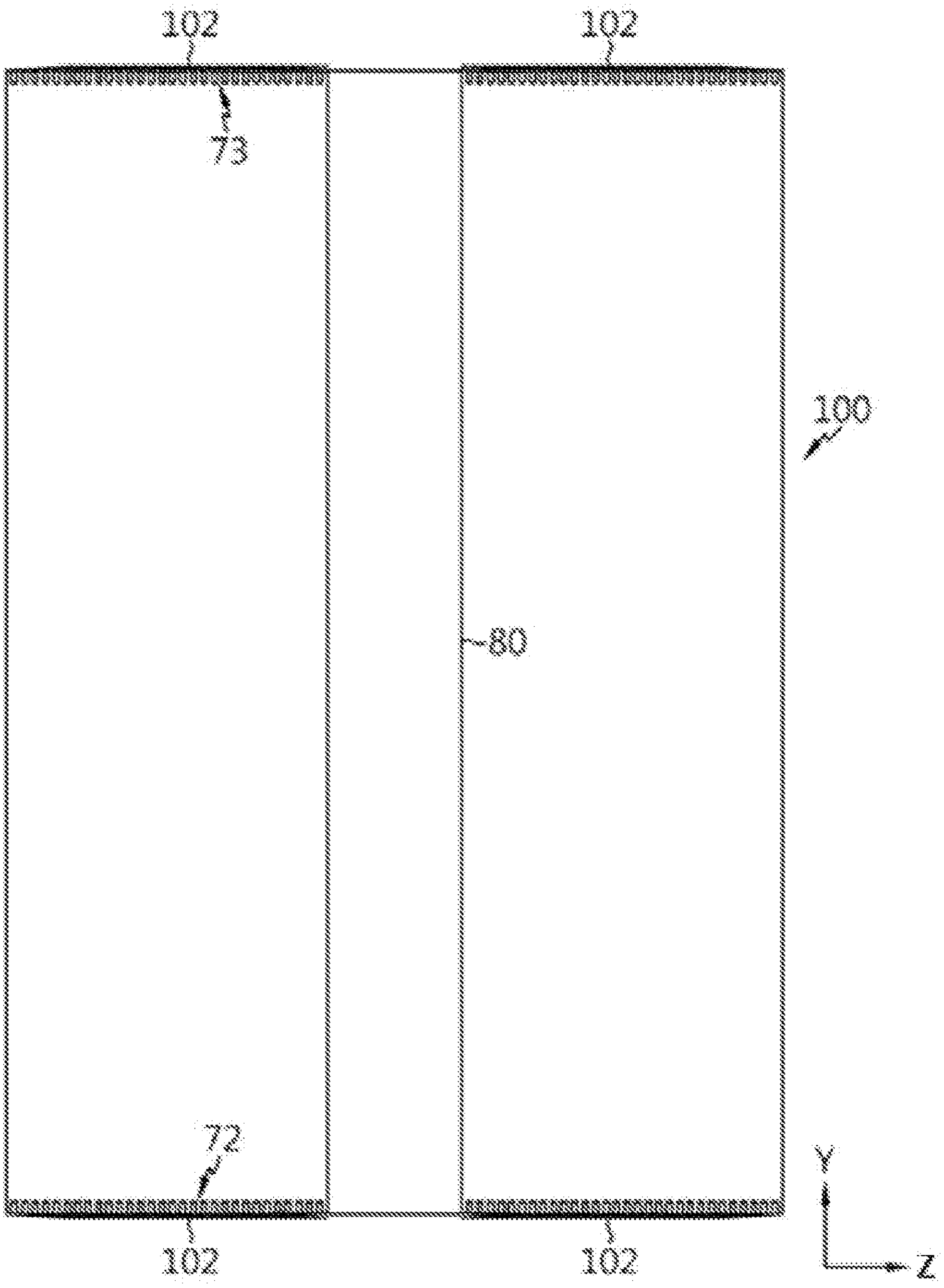

[FIG. 14]
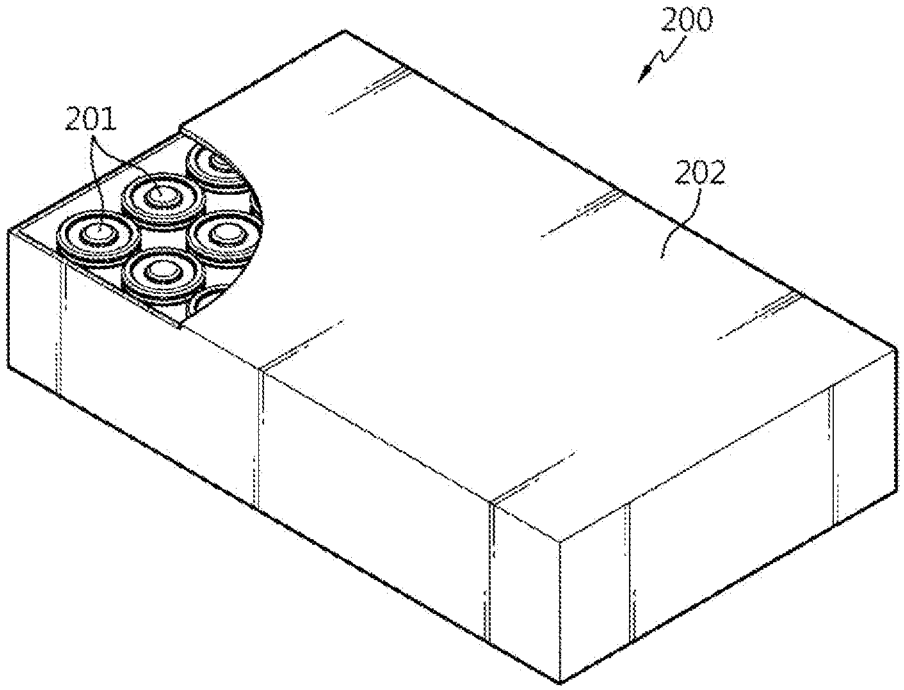
[FIG. 15]
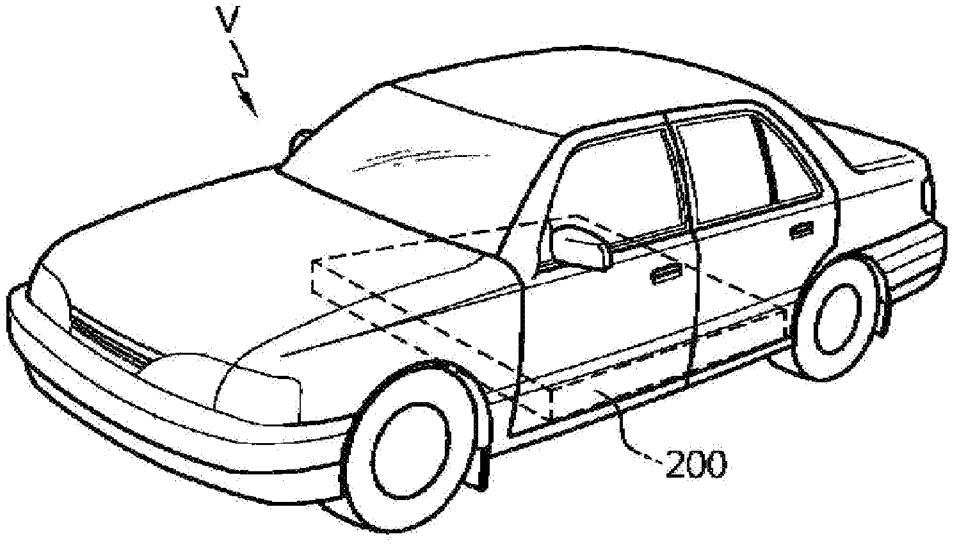

[FIG. 16]
(a)
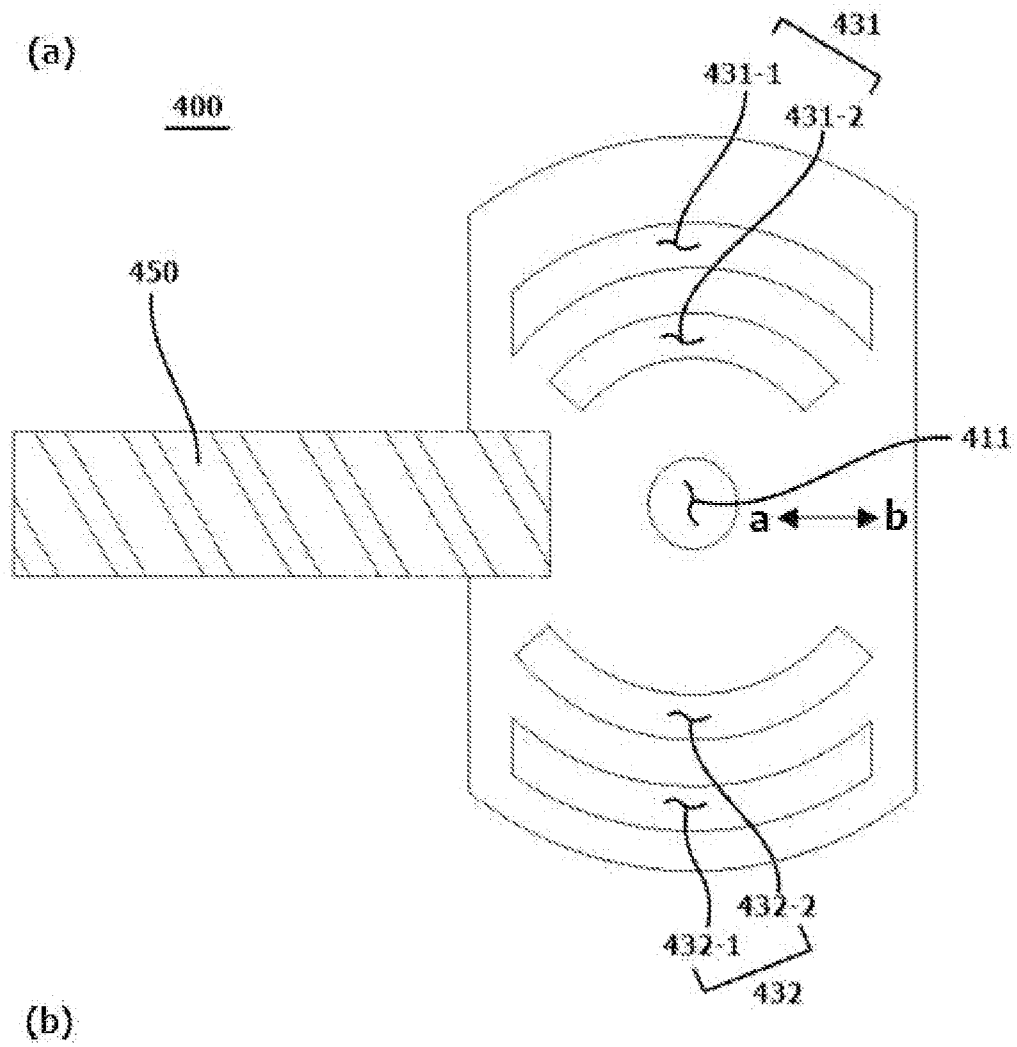
(b)
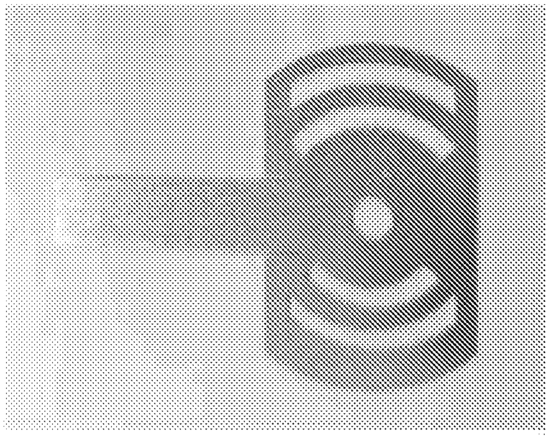

[FIG. 17]
(a)
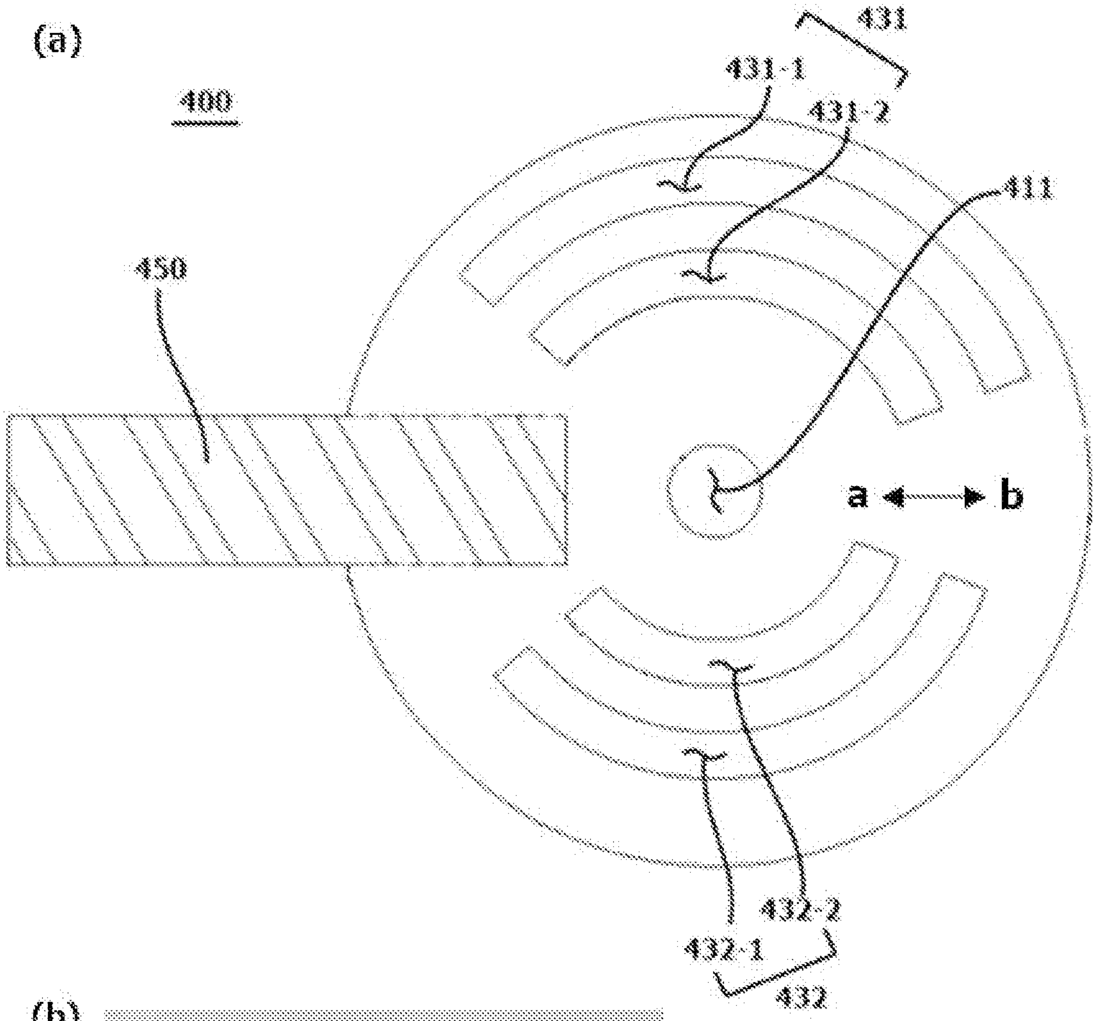
(b)
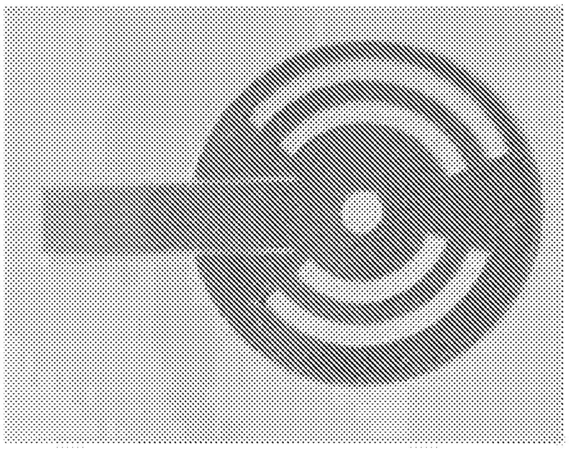

[FIG. 18]
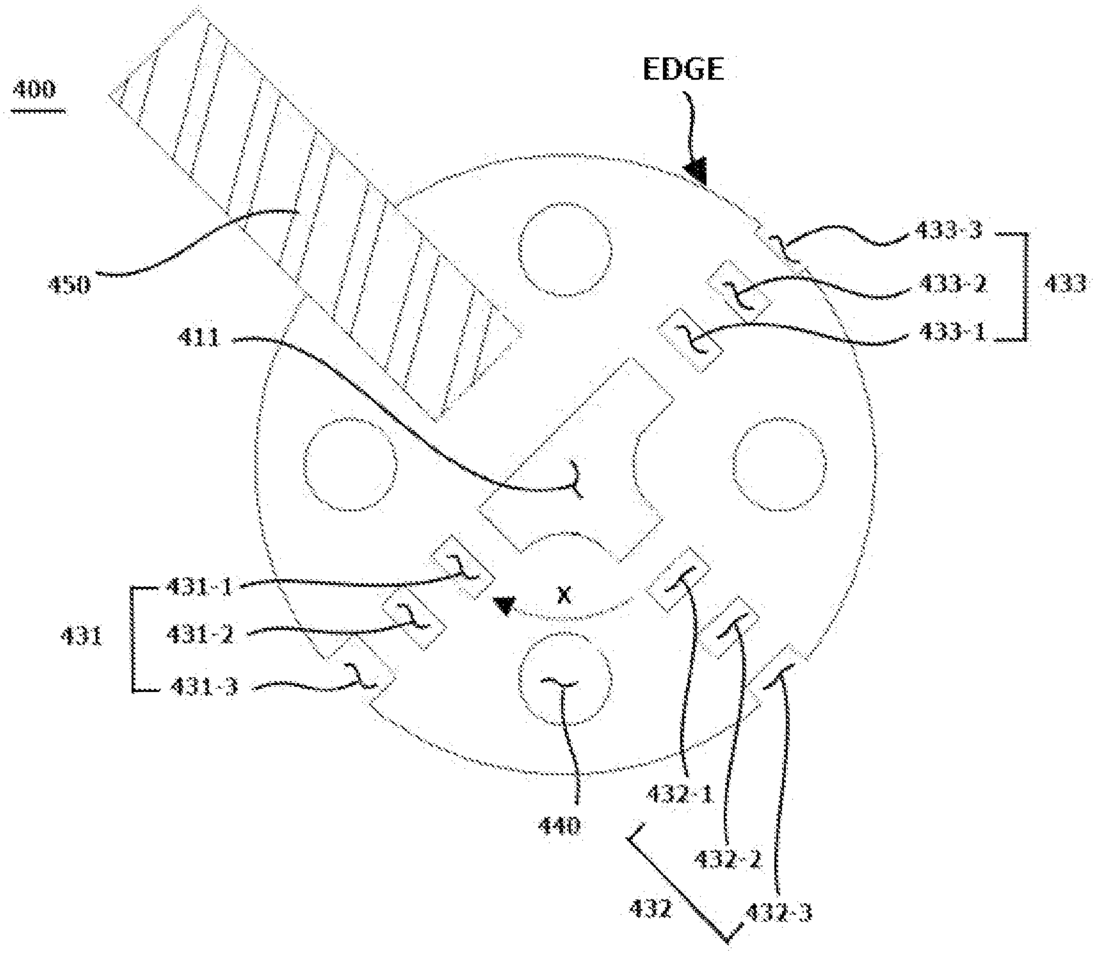

[FIG. 19]
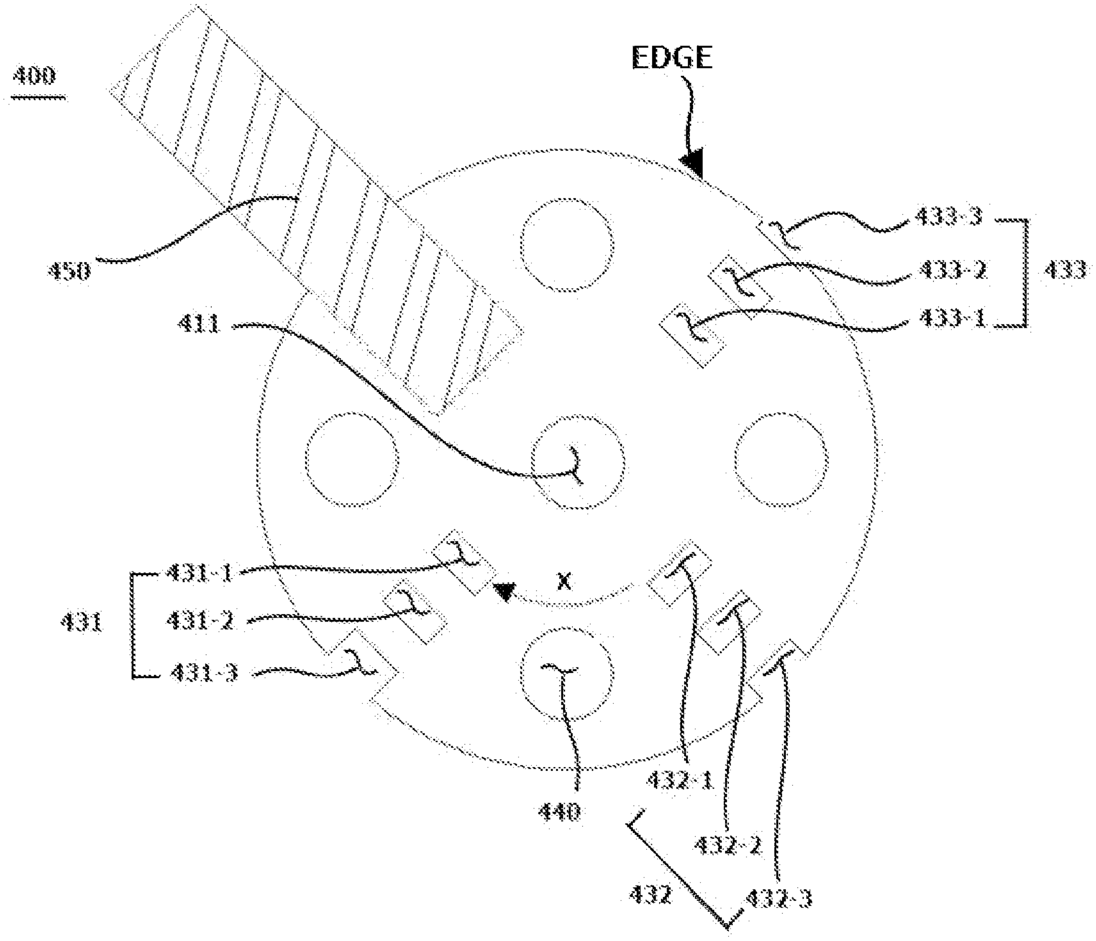

[FIG. 20]
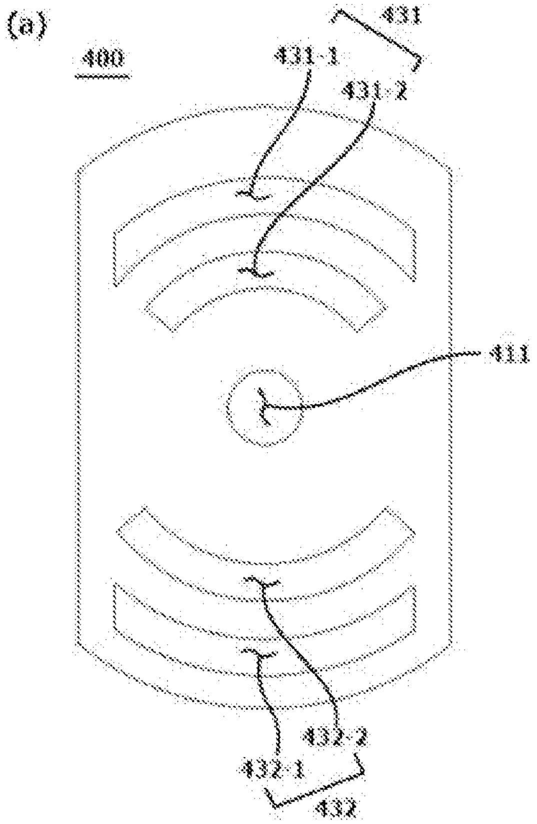

[FIG. 21]
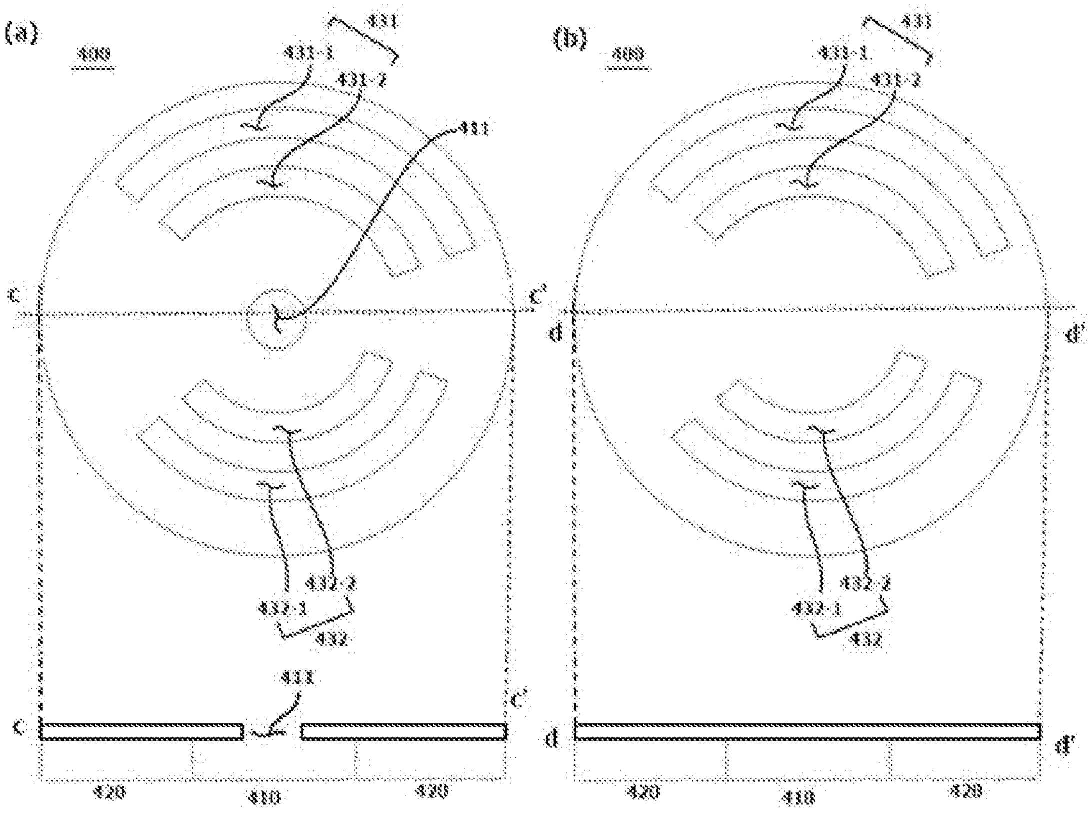

[FIG. 22]
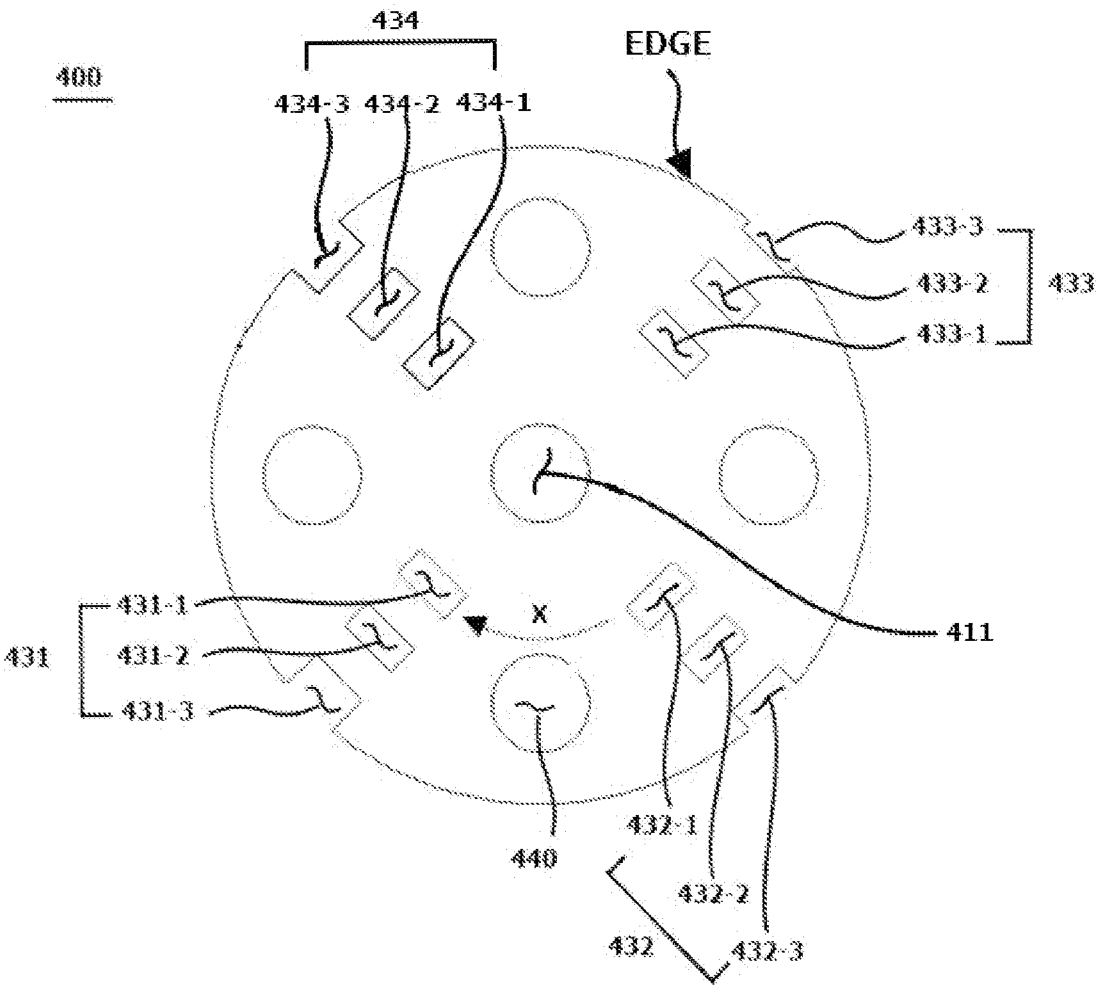

[FIG. 23]
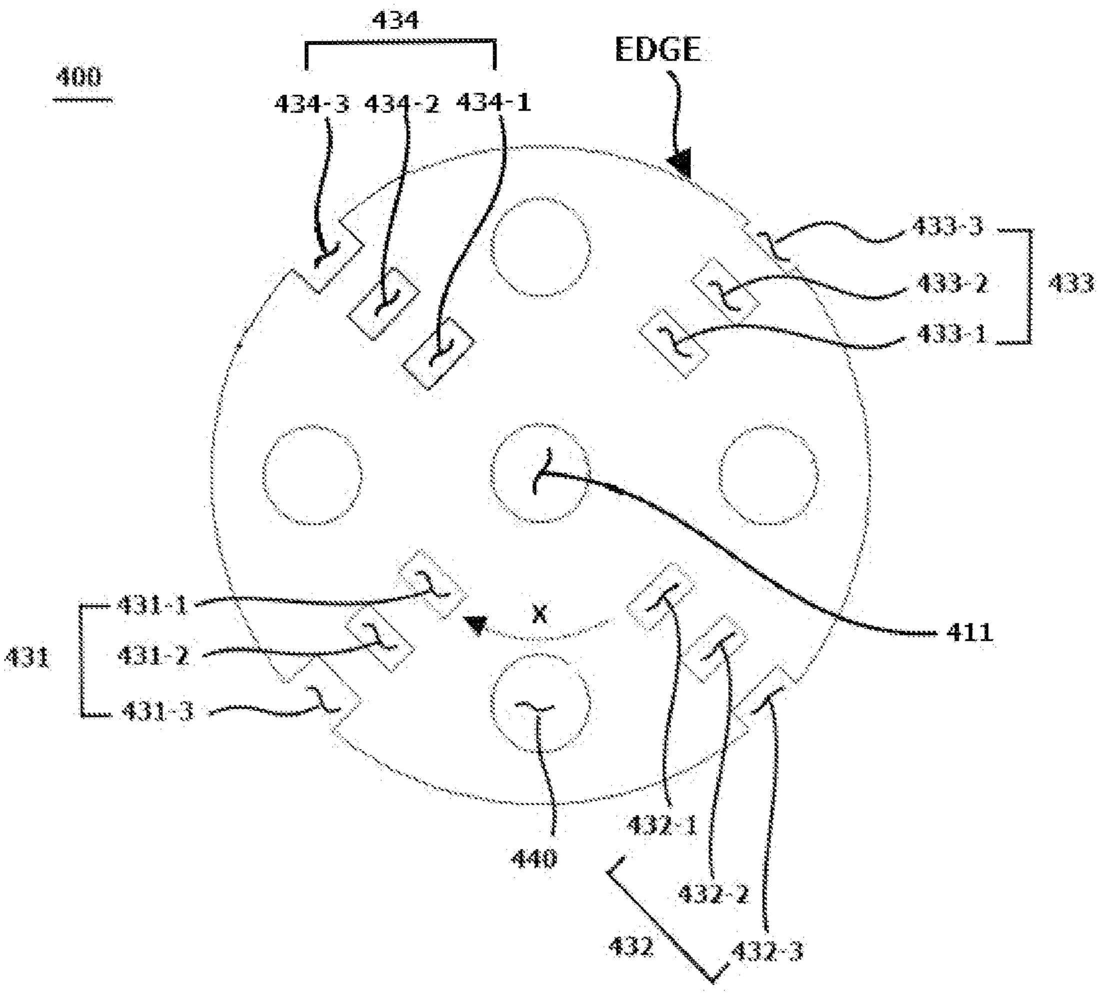

[FIG 24]
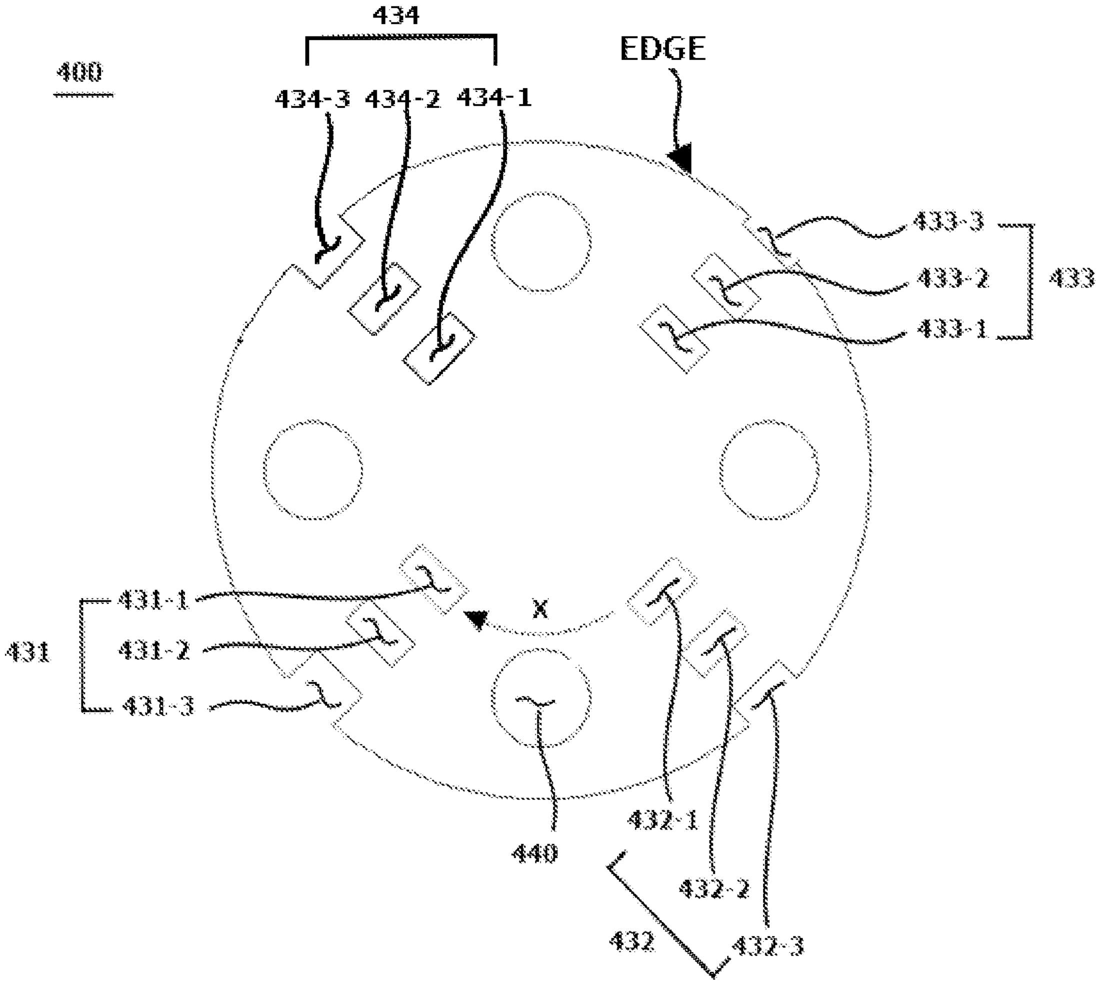

SECONDARY BATTERY, AND BATTERY PACK AND VEHICLE COMPRISING SAME

TECHNICAL FIELD

This application claims priority to and the benefit of Korean Patent Application No. 10-2021-0022865 filed with the Korean Intellectual Property Office on Feb. 19, 2021, the entire contents of which are incorporated herein by reference.

The present invention relates to a secondary battery and a battery pack and a vehicle including the same.

BACKGROUND ART

A secondary battery is easy to apply to product groups and has high electrical characteristics such as high energy density. Therefore, the secondary battery is widely applied not only to portable devices but also to electric vehicles (EVs) or hybrid electric vehicles (HEVs) driven by electrical driving sources.

The secondary battery attracts attention as a new energy source for improving environmental-friendly characteristics and energy efficiency because the secondary battery achieves a primary advantage of innovatively reducing the use of fossil fuel and does not generate any by-products from the use of energy.

Types of secondary batteries currently used widely include a lithium-ion battery, a lithium-polymer battery, a nickel-cadmium battery, a nickel-hydrogen battery, a nickel-zinc battery, and the like. An operating voltage of a unit secondary battery cell is about 2.5 V to 4.5 V. Therefore, when an output voltage higher than the operating voltage is required, a plurality of batteries is connected in series and constitutes a battery pack. In addition, the plurality of batteries is connected in parallel and constitutes the battery pack depending on a charge/discharge capacity required for the battery pack. Therefore, the number of batteries included in the battery pack and the type of electrical connection between the batteries may be variously set depending on required output voltages and/or charge/discharge capacities.

Meanwhile, cylindrical batteries, angular batteries, and pouch batteries are known as the types of secondary battery cells. The cylindrical battery is made by interposing a separator, which is an insulator, between a positive electrode and a negative electrode, winding the assembly of the separator, the positive electrode, and the negative electrode to form an electrode assembly in the form of a jelly roll, and inserting the electrode assembly together with an electrolyte into a battery can. For reference, a positive electrode terminal is a cap of a sealing body configured to seal an opening port of the battery can, and a negative electrode terminal is a battery can.

As illustrated in FIG. 8, there is a problem in that welding spatters are formed as the current collecting plate is melted because of a large amount of heat inputted to a region in which the non-coated portion is not in contact with the current collecting plate because of a deviation in height of the non-coated portion at the time of performing welding to implement electrical connection between the electrode assembly and the current collecting plate. The welding spatters remain as metal substances in the secondary battery, which may cause a low-voltage defect due to a fine short circuit.

DETAILED DESCRIPTION OF THE INVENTION

Technical Problem

An object of the present invention is to provide a secondary battery having a structure capable of ensuring a uniform contact area in a welding region in order to reduce welding spatters.

Technical Solution

The present specification provides a secondary battery including: an electrode assembly in which first and second electrodes and a separator provided between the first and second electrodes are wound, the first and second electrodes each including a non-coated portion disposed at a long side end thereof, exposed to an outside of the separator, and having no active material applied thereto; and a current collecting plate provided at one end of the electrode assembly at which the non-coated portion of the first electrode is exposed, the current collecting plate including a central portion corresponding to a core of the electrode assembly, and a peripheral portion provided around the central portion and configured to adjoin one end of the electrode assembly, in which the peripheral portion includes one or more first through-holes penetrated by at least a part of the non-coated portion of the first electrode.

In the embodiment of the present specification, the central portion of the current collecting plate may further include a center hole provided in a portion corresponding to the core of the electrode assembly.

In the embodiment of the present specification, the non-coated portion of the first electrode exposed to the outside through the first through-holes of the current collecting plate may be bent one or more times in a direction toward the core of the electrode assembly.

In the embodiment of the present specification, the one or more first-through holes may include two or more first through-holes spaced apart from one another in a winding direction of the electrode assembly.

In the embodiment of the present specification, the peripheral portion of the current collecting plate may include one or more first through-hole groups, each of the first through-hole groups including two or more first through-holes spaced apart from one another in a direction from the central portion toward one outer peripheral portion.

In the embodiment of the present specification, each of the first through-hole groups may include two to six first through-holes of the one or more first through-holes spaced apart from one another in the direction from the central portion toward one outer peripheral portion.

In the embodiment of the present specification, the one or more first through-hole groups may include two to six first through-hole groups, and the first through-hole groups may be disposed to be spaced apart from one another in a winding direction of the electrode assembly.

In the embodiment of the present specification, the one or more first through-hole groups may include two first through-hole groups, and the two first through-hole groups face each other with the central portion interposed therebetween.

In the embodiment of the present specification, the one or more first through-hole groups may include three to six first through-hole groups, and the first through-hole groups may be disposed to be spaced apart from one another in a winding direction of the electrode assembly.

In the embodiment of the present specification, at least one of the first through-holes may adjoin an edge of the current collecting plate.

In the embodiment of the present specification, each of the first through-holes may have a slit or dot shape.

In the embodiment of the present specification, the peripheral portion of the current collecting plate may further include one or more second through-holes.

In the embodiment of the present specification, the one or more first through-hole groups may include two or more first through-holes groups, the peripheral portion of the current collecting plate may further include one or more second through-holes, and each second through-hole may be provided between two adjacent first through-hole groups.

In the embodiment of the present specification, the current collecting plate may further include an electrode tab.

The present specification provides a battery pack including a plurality of secondary batteries described above.

The present specification provides a vehicle including at least one battery pack described above.

The present specification provides a vehicle including at least one battery pack described above.

Advantageous Effects

The secondary battery according to the embodiment of the present specification has a structure in which at least a part of the electrode non-coated portion of the electrode assembly is bent and exposed to the outside through the current collecting plate, which makes it possible to ensure a uniform welding area during the process of welding the current collecting plate and the electrode assembly.

In addition, the laser beams are emitted toward the bent electrode non-coated portion having a relatively small thickness during the welding process, which makes it possible to reduce the amount of energy required to emit the laser beams.

BRIEF DESCRIPTION OF DRAWINGS

FIG. 1 is a top plan view illustrating a structure of a plate-shaped electrode according to an embodiment of the present specification before the electrode is wound.

FIG. 2 is a view illustrating a process of winding an electrode assembly according to the embodiment of the present specification.

FIG. 3 is an assembled view illustrating a process in which current collecting plates are provided at two opposite ends of a non-coated portion after the electrode assembly illustrated in FIG. 2 is wound.

FIG. 4 is a cross-sectional view taken in a longitudinal direction Y and illustrating a secondary battery according to the embodiment of the present specification.

FIG. 5 is a cross-sectional view illustrating a riveting structure of an electrode terminal according to another embodiment of the present specification.

FIG. 6 is a cross-sectional view of a part indicated by the dash-dotted circle B in FIG. 5.

FIG. 7 is a cross-sectional view taken in the longitudinal direction Y and illustrating a secondary battery according to another embodiment of the present specification.

FIG. 8 is a view illustrating a region in which the non-coated portion is not in contact with a current collecting plate because of a deviation in height of the non-coated portion.

FIG. 9 is a view illustrating a center hole, a first through-hole, a second through-hole, and a first electrode non-coated portion exposed through a first through-hole in the current collecting plate according to the embodiment of the present specification.

FIG. 10 is a view illustrating a state in which the first electrode non-coated portion according to the embodiment of the present specification is exposed to the outside of the current collecting plate and then bent.

FIG. 11 is a top plan view exemplarily illustrating a structure of a plate-shaped electrode according to another embodiment of the present specification before the plate-shaped electrode is wound.

FIG. 12 is a cross-sectional view taken in the longitudinal direction Y and illustrating an electrode assembly according to another embodiment of the present specification in which a segmental structure of a non-coated portion of the electrode is applied to first and second electrodes.

FIG. 13 is a cross-sectional view taken in the longitudinal direction Y and illustrating an electrode assembly according to another embodiment of the present specification in which a non-coated portion is bent.

FIG. 14 is a view illustrating a schematic configuration of a battery pack including cylindrical battery cells according to the embodiment of the present specification.

FIG. 15 is a view illustrating a schematic configuration of a vehicle including the battery pack according to the embodiment of the present specification.

FIGS. 16 to 24 are views illustrating various shapes of the current collecting plate according to the embodiment of the present specification.

EXPLANATION OF REFERENCE NUMERALS AND SYMBOLS

10: First electrode
10*a*: Non-coated portion of first electrode
11: Second electrode
11*a*: Non-coated portion of second electrode
12: Separator
30, 31: Current collecting plate
71, A, 100: Electrode assembly
Y: Longitudinal direction
X: Winding direction
Z: Outer peripheral direction
40, 70: Secondary battery
41, 51: Battery can
42, 74: Sealing body
42*a*, 74*a*: Cap plate
42*b*, 74*b*: Sealing gasket
42*c*: Connection plate
43, 75: Crimping portion
44, 76: Beading portion
45: Lead
46: Insulator
50: Electrode terminal
50*a*: Body portion
50*b*: Outer flange portion
50*c*: Inner flange portion
50*d*: Flat portion
52: Bottom of battery can
52*a*: Outer surface of bottom of battery can
52*b*: Inner surface of bottom of battery can
53: Through-hole
54: Riveting gasket
54*a*: Outer gasket
54*b*: Inner gasket
55: Recessed portion
55*a*: Sidewall of flat portion

55*b*: Inclined surface of inner flange portion
56: Inner edge of through-hole
57: Facing surface facing inner flange portion
H1: Height of flat portion
H2: Height of end of inner gasket
H3: Height of end of inner flange portion
R1: Radius from center of body portion to edge of outer flange portion
R2: Radius of bottom of battery can
R3: Radius from center of body portion to edge of flat portion
72: Non-coated portion of second electrode
73: Non-coated portion of first electrode
76*a*: Inner peripheral surface of beading portion
77: Vent notch
78: Second current collecting plate
78*a*: At least part of edge not being in contact with non-coated portion of second electrode
79: First current collecting plate
80: Cavity
90: Electrode
91: Current collector
92: Active material layer
93: Non-coated portion
93': Core side non-coated portion
93*a*: Segmental piece
h: Height of segmental piece
r: Radial length of winding region defined by core side non-coated portion
94: Insulating coating layer
101: Bent portion
102: Bent surface
200: Battery pack
201: Cylindrical battery cell
202: Pack housing
V: Vehicle
300: Electrode assembly
311: Non-coated portion of first electrode
320: Debossed portion
330: Protruding portion
340: Core
400: Current collecting plate
410: Central portion
411: Center hole
420: Peripheral portion
430, 431-1, 431-2, 431-3, 432-1, 432-2, 432-3, 433-1, 433-2, 433-3, 434-1, 434-2, 434-3: First through-hole
431, 432, 433, 434: First through-hole group
440: Second through-hole
450: Electrode tab
a: Direction toward core
b: Direction toward outer periphery

BEST MODE

Hereinafter, the present specification will be described in more detail.

Hereinafter, exemplary embodiments of the present invention will be described in detail with reference to the accompanying drawings. In addition, terms or words used in the specification and the claims should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method. Therefore, the exemplary embodiments disclosed in the present specification and the configurations illustrated in the drawings are just the best preferred exemplary embodiments of the present invention and do not represent all the technical spirit of the present invention. Accordingly, it should be appreciated that various equivalents and modified examples capable of substituting the exemplary embodiments may be made at the time of filing the present application.

In addition, to help understand the present invention, the accompanying drawings are not illustrated based on actual scales, but some constituent elements may be exaggerated in dimension. In addition, the constituent elements in different embodiments may be assigned with the same reference numerals.

The expression indicating that the two comparison targets are equal to each other means that the two comparison targets are 'substantially' equal to each other. Therefore, the substantial equality may include a case in which a deviation considered as being at a low level in the art is present, for example, a deviation within 5% is present. In addition, a configuration in which a particular parameter is constant in a predetermined region may mean that the parameter is constant from an average point of view.

In the present specification, the term "on" not only means that a layer is positioned on one layer while being in physical contact with the layer but also means that a layer is positioned above one layer. That is, still another layer may be present between one layer and another layer positioned on one layer.

In the specification, unless explicitly described to the contrary, the word "comprise" or "include" and variations, such as "comprises", "comprising", "includes" or "including", will be understood to imply the inclusion of stated constituent elements, not the exclusion of any other constituent elements.

A secondary battery 40 or 70 according to an embodiment of the present specification includes an electrode assembly 300 and a current collecting plate 400.

The embodiment of the present specification provides the secondary battery 40 or 70 including: an electrode assembly 71, A, or 100 in which first and second electrodes 10 and 11 and a separator 12 provided between the first and second electrodes 10 and 11 are wound, the first and second electrodes 10 and 11 each including a non-coated portion 311 disposed at a long side end thereof, exposed to the outside of the separator 12, and having no active material applied thereonto; and a current collecting plate 400 provided at one end of the electrode assembly 71, A, or 100 at which the non-coated portion 311 of the first electrode 10 is exposed, the current collecting plate 400 including a central portion 410 corresponding to a core 340 of the electrode assembly 71, A, or 100, and a peripheral portion 420 provided around the central portion 410 and configured to adjoin one end of the electrode assembly 71, A, or 100. The peripheral portion 420 includes one or more first through-holes 430 penetrated by at least a part of the non-coated portion 311 of the first electrode 10.

In the embodiment of the present specification, the current collecting plate 400 includes: the central portion 410 corresponding to the core 340 of the electrode assembly 71, A, or 100 and provided at one end of the electrode assembly 71, A, or 100 at which the non-coated portion 311 of the first electrode 10 is exposed; and the peripheral portion 420 provided around the central portion 410 and configured to adjoin one end of the electrode assembly 71, A, or 100. The peripheral portion 420 includes the one or more first through-holes 430 penetrated by at least a part of the non-coated portion 311 of the first electrode 10.

The first through-hole 430 serves as a passageway through which the non-coated portion 311 of the first electrode 10 penetrates the current collecting plate 400 when the electrode assembly 71, A, or 100 and the current collecting plate 400 are coupled to each other. FIG. 9 illustrates that the non-coated portion 311 of the first electrode 10 penetrates the current collecting plate 400 through the first through-hole 430.

At least a part of the first electrode non-coated portion 311 of the electrode assembly 71, A, or 100 is cut to conform to a shape of the first through-hole 430 of the current collecting plate 400.

In the embodiment of the present specification, the central portion 410 of the current collecting plate 400 may further include a center hole 411 provided in a portion corresponding to the core 340 of the electrode assembly 71, A, or 100. FIGS. 9 and 16 to 19 illustrate various embodiments in which the center hole 411 is provided.

The center hole 411 may have a circular shape or a shape in which a straight line and a curved line are connected.

In the embodiment of the present specification, the non-coated portion 311 of the first electrode 10 exposed to the outside through the first through-hole 430 of the current collecting plate 400 may be bent one or more times in a direction (a) toward the core of the electrode assembly 71, A, or 100.

In the embodiment of the present specification, the non-coated portion 311 of the first electrode 10 exposed to the outside through the first through-hole 430 of the current collecting plate 400 may be bent two or more times in the direction (a) toward the core of the electrode assembly 71, A, or 100.

In the embodiment of the present specification, at least one surface of the non-coated portion of the first electrode, which is exposed to the outside through the first through-hole 430 and bent one or more times, may be in contact with an upper portion of the current collecting plate 400. In this case, the non-coated portion 311 of the first electrode 10 is cut and thus includes a protruding portion 330 corresponding to the first through-hole 430, and a debossed portion 320 recessed by cutting the non-coated portion 311 so that the protruding portion 330 protrudes. The protruding portion 330 penetrates the first through-hole 430 and then is bent in the direction (a) toward the core of the electrode assembly 71, A, or 100 and fastened. The protruding portion 330 fastened as described above is fixed by laser welding. FIG. 10 illustrates the non-coated portion 311 of the first electrode 10 bent one or more times.

In contrast, the debossed portion 320 is in contact with a lower portion of the current collecting plate 400 that does not have the first and second through-holes 430 and 440. The end of the non-coated portion 311 of the first electrode 10 is uniformly formed by cutting, such that the debossed portion 320 and the lower portion of the current collecting plate 400 may be uniformly in contact with each other without a deviation in height.

The process of welding the electrode assembly 71, A, or 100 and the current collecting plate 400 may be performed by emitting laser beams toward the non-coated portion 311 of the first electrode 10 exposed to the outside through the first through-hole 430 and bent.

In this case, the non-coated portion 311 of the first electrode 10, which is irradiated with the laser beams, has a relatively smaller thickness than the current collecting plate 400, which advantageously reduces the amount of energy required to emit the laser beam.

In the embodiment of the present specification, the peripheral portion 420 of the current collecting plate 400 may include two or more first through-holes 431-1, 431-2, 431-3, 432-1, 432-2, 432-3, 433-1, 433-2, 433-3, 434-1, 434-2, and 434-3 spaced apart from one another in a winding direction X of the electrode assembly 71, A, or 100. The winding direction X of the electrode assembly means a direction in which the electrode assembly is wound around a winding axis. FIGS. 16 to 24 illustrate positions at which the first through-holes 430 are disposed in the peripheral portion 420.

The peripheral portion 420 of the current collecting plate 400 may include three or more first through-holes 430 spaced apart from one another in the winding direction X of the electrode assembly 71, A, or 100.

The peripheral portion 420 of the current collecting plate 400 may include four or more first through-holes 430 spaced apart from one another in the winding direction X of the electrode assembly 71, A, or 100.

The peripheral portion 420 of the current collecting plate 400 may include nine or more first through-holes 430 spaced apart from one another in the winding direction X of the electrode assembly 71, A, or 100.

The peripheral portion 420 of the current collecting plate 400 may include twelve or more first through-holes 430 spaced apart from one another in the winding direction X of the electrode assembly 71, A, or 100.

In the embodiment of the present specification, the peripheral portion 420 of the current collecting plate 400 may include one or more first through-hole groups 431 each including two or more first through-holes 430 spaced apart from each other in a direction b from the central portion 410 toward one outer peripheral portion. That is, the two or more first through-holes 430 included in the first through-hole group 431 have different shortest distances from the central portion. FIGS. 16 to 24 illustrate that the first through-hole group 431 having various structures is disposed in the peripheral portion 420.

In the embodiment of the present specification, the first through-hole group 431 may include two to six first through-holes 430. That is, in the present specification, one first through-hole group 431 may include two to six first through-holes 430, and the two to six first through-holes 430 included in the first through-hole group 431 may have different shortest distances from the central portion 410.

In the embodiment of the present specification, the first through-hole group 431 may include two to five first through-holes 430.

In the embodiment of the present specification, the first through-hole group 431 may include two to four first through-holes 430.

In the embodiment of the present specification, the first through-hole group 431 may include two to three first through-holes 430.

In the embodiment of the present specification, as illustrated in FIGS. 16, 17, 20A, 20B, 21A, and 21B, the first through-hole groups 431 and 432 may each include two first through-holes 431-1, 431-2, 432-1, and 432-2.

In the embodiment of the present specification, as illustrated in FIGS. 18 and 19, the first through-hole groups 431, 432, and 433 may each include three first through-holes 431-1, 431-2, 431-3, 432-1, 432-2, 432-3, 433-1, 433-2, and 433-3.

In the embodiment of the present specification, as illustrated in FIGS. 22 to 24, the first through-hole groups 431, 432, 433, and 434 may include four first through-holes 431-1, 431-2, 431-3, 432-1, 432-2, 432-3, 433-1, 433-2, 433-3, 434-1, 434-2, and 434-3.

In the embodiment of the present specification, the peripheral portion 420 of the current collecting plate 400 may include two to six first through-hole groups 431, and the first through-hole groups 431 may be disposed to be spaced apart from one another in the winding direction X of the electrode assembly 71, A, or 100.

In the embodiment of the present specification, the peripheral portion 420 of the current collecting plate 400 includes two first through-hole groups 431. As illustrated in FIGS. 16, 17, 20A, 20B, 21A, and 21B, the two first through-hole groups 431 and 432 may face each other with the central portion 410 interposed therebetween.

In the embodiment of the present specification, the peripheral portion 420 of the current collecting plate 400 may include three to six first through-hole groups 431, and the first through-hole groups 431 may be disposed to be spaced apart from one another in the winding direction X of the electrode assembly 71, A, or 100.

In the embodiment of the present specification, at least one of the first through-holes 430 may adjoin an edge of the current collecting plate 400.

In the embodiment of the present specification, the first through-hole 430 may have a slit or dot shape. The slit may have a shape including at least two curved lines having different radii of curvature. The dot shape may be, but not limited to, a rectangular shape, a trapezoidal shape, or the like.

In the embodiment of the present specification, the peripheral portion 420 of the current collecting plate 400 may further include one or more second through-holes 440. The second through-hole 440 is used to inject an electrolyte.

In the embodiment of the present specification, the peripheral portion 420 of the current collecting plate 400 may further include the one or more second through-holes 440, and the second through-hole 440 may be provided between the two adjacent first through-hole groups 431.

That is, the second through-hole 440 may be spaced apart from the center hole 411 and also spaced apart from the first through-hole 430.

In the embodiment of the present specification, the current collecting plate 400 may further include an electrode tab 450. In the case in which the electrode tab 450 is provided, the electrode tab 450 is connected by being bent to conform to the structure of the battery cell at the time of assembling the battery cell.

The secondary battery 40 or 70 according to the embodiment of the present specification includes: the electrode assembly 71, A, or 100 in which the first electrode 10, the separator 12, and the second electrode 11 are stacked and wound, the first electrode 10 including a first electrode current collector (not illustrated) and an electrode active material layer (not illustrated) provided on the first electrode current collector (not illustrated), in which a long side end of the first electrode current collector (not illustrated) based on the winding direction X includes a non-coated portion 10*a* of the first electrode 10 that does not have the electrode active material layer; and the current collecting plate 400 provided at one end of the electrode assembly 71, A, or 100 at which the non-coated portion 10*a* of the first electrode 10 is exposed, the current collecting plate 400 including the central portion 410 corresponding to the core 340 of the electrode assembly 71, A, or 100. The central portion 410 includes a first welding portion having a smaller thickness than the remaining portion of the current collecting plate 400.

In the embodiment of the present specification, a ratio between an average thickness of the first welding portion and a thickness of the current collecting plate excluding the first welding portion may be 0.4:1 to 0.9:1. The ratio between the average thickness of the first welding portion and the thickness of the current collecting plate 400 excluding the first welding portion may be 0.4:1, 0.5:1, 0.6:1, 0.7:1, 0.8:1, or 0.9:1.

In the embodiment of the present specification, the current collecting plate 400 may include the central portion 410 including the first welding portion (not illustrated) and the peripheral portion 420 separated from the central portion 410. In the peripheral portion 420, the entire edge of the central portion 410 may extend in the outer peripheral direction Z of the electrode assembly 300. The current collecting plate 400 having the above-mentioned shape may have a circular plate shape, an elliptical shape, or the like. The peripheral portion 420 may include a second welding portion having a smaller thickness than the remaining portion excluding the first welding portion.

In another embodiment of the present specification, a part of the edge of the central portion 410 may include one or more legs extending in the outer peripheral direction Z of the electrode assembly 300. That is, the peripheral portion 420 may include the second welding portion having a smaller thickness than the remaining portion excluding the first welding portion.

In the embodiment of the present specification, a ratio between an average thickness of the second welding portion and a thickness of the current collecting plate excluding the first and second welding portions may be 0.4:1 to 0.9:1. The ratio between the average thickness of the second welding portion and the thickness of the current collecting plate excluding the first and second welding portions may be 0.4:1, 0.5:1, 0.6:1, 0.7:1, 0.8:1, or 0.9:1.

FIG. 1 illustrates a structure of the current collector according to the embodiment of the present specification, FIG. 2 illustrates a process of winding the electrode assembly 71, A, or 100 having the electrodes 10 and 11 and the separator 12 according to the embodiment of the present specification, and FIG. 3 illustrates a process of welding the current collecting plate to a bent surface of the non-coated portion 10*a* according to the embodiment of the present specification.

FIG. 4 illustrates a structure in which a lead 45 having a strip shape is used when the current collecting plate 400 and the electrode terminal 50 are connected to each other in the secondary battery.

Referring to FIGS. 1 to 4, the first and second electrodes 10 and 11 each have a structure in which an active material layer 92 is provided by coating a current collector 91 having a sheet shape with an active material. The first and second electrodes 10 and 11 may each include a non-coated portion 93 disposed at one long side thereof based on the winding direction.

The electrode assembly is manufactured by sequentially stacking the first and second electrodes 10 and 11 together with two sheets of separators 12 to form a stack, as illustrated in FIG. 2, and then winding the stack in one direction X. In this case, the non-coated portions of the first and second electrodes 10 and 11 may be disposed in opposite directions. After the winding process, the non-coated portion 10*a* of the first electrode 10 and the non-coated portion 11*a* of the second electrode 11 are bent toward the core. There-after, as illustrated in FIG. 3, the current collecting plates 30 and 31 are respectively coupled to the non-coated portions 10*a* and 11*a* by welding.

The separate electrode tab is not coupled to the non-coated portion 10*a* of the first electrode and the non-coated portion 11*a* of the second electrode, and the current collecting plates 30 and 31 are connected to the external electrode terminals. Therefore, a current path having a large cross-sectional area is formed in the direction of the winding axis of the electrode assembly A (see the arrow), thereby reducing the resistance of the battery cell. This is because the resistance is inversely proportional to a cross-sectional area of a passageway through which current flows.

As illustrated in FIG. 4, the secondary battery 40 according to the embodiment of the present specification includes a battery can 41 and a sealing body 42. The sealing body 42 includes a cap plate 42*a*, a sealing gasket 42*b*, and a connection plate 42*c*. The sealing gasket 42*b* surrounds an edge of the cap plate 42*a* and is fixed by a crimping portion 43. In addition, the electrode assembly A is fixed in the battery can 41 by a beading portion 44 so that the electrode assembly A is prevented from moving upward or downward.

Typically, the positive electrode terminal is the cap plate 42*a* of the sealing body 42, and the negative electrode terminal is the battery can 41. Therefore, the current collecting plate 30 coupled to the non-coated portion 10*a* of the first electrode 10 is electrically connected to the connection plate 42*c* attached to the cap plate 42*a* through the lead 45 having a strip shape. In addition, the current collecting plate 31 coupled to the non-coated portion 11*a* of the second electrode 11 is electrically connected to a bottom of the battery can 41. The insulator 46 covers the current collecting plate 30 and prevents a short circuit caused by contact between the battery can 41 and the non-coated portion 10*a* of the first electrode 10 that have different polarities.

Referring to FIG. 4, the lead 45 having a strip shape is used to connect the current collecting plate 30 to the connection plate 42*c*. The lead 45 is separately attached to the current collecting plate 30 or manufactured integrally with the current collecting plate 30. However, since the lead 45 has a strip shape having a small thickness and thus has a small cross-sectional area, a large amount of heat is generated when high-speed charging current flows. In addition, an excessive amount of heat generated by the lead 45 is transferred to the electrode assembly A and contracts the separator 12, which may cause an internal short circuit which is a main cause of thermal runaway. The lead 45 occupies a significantly large installation space in the battery can 41. Therefore, the secondary battery 40 including the lead 45 has low spatial efficiency and thus has a limitation in increasing energy density.

In the embodiment of the present specification, the first electrode includes the current collector and the electrode active material layer provided on one surface or two opposite surfaces of the current collector. The non-coated portion (hereinafter, referred to as a 'first non-coated portion') of the first electrode, which does not have the electrode active material layer, is present at a long side end in a winding direction of the current collector provided at one end of the winding axis of the electrode assembly. The first non-coated portion is provided at an upper side in a height direction (a direction parallel to a Z-axis) of the electrode assembly accommodated in the battery can. That is, the current collector includes the non-coated portion of the first electrode disposed at the long side end thereof and exposed to the outside of the separator, and the non-coated portion of the first electrode is not coated with the electrode active material.

In the embodiment of the present specification, the second electrode includes a second electrode current collector and a second electrode active material layer provided on one surface or two opposite surfaces of the second electrode current collector. The non-coated portion (hereinafter, referred to as a 'second non-coated portion') of the second electrode is present at the other side end in a width direction (a direction parallel to the Z-axis) of the second electrode current collector, and the non-coated portion of the second electrode does not include the second electrode active material layer.

The non-coated portion of the second electrode is provided at a lower side in the height direction (direction parallel to the Z-axis) of the electrode assembly accommodated in the battery can. That is, the second electrode current collector includes a second non-coated portion disposed at the long side end thereof and exposed to the outside of the separator, and the second non-coated portion is not coated with the electrode active material layer. At least a part of the second non-coated portion itself may be used as the electrode tab. For example, the second non-coated portion may be a negative electrode tab.

In the embodiment of the present specification, the electrode assembly may have a target welding region which is a region in which the number of superimposed layers of the segmental piece of the non-coated portion of the second electrode is uniformly maintained in a radial direction of the electrode assembly.

The number of superimposed layers is maximally maintained in this region. Therefore, the second current collecting plate to be described below and the non-coated portion of the second electrode may be welded in this region. In the case in which the laser welding is applied and an output of the laser is increased to improve welding quality, this configuration may prevent the laser beam from penetrating the non-coated portion of the second electrode and damaging the electrode assembly. In addition, it is possible to effectively prevent foreign substances such as welding spatters from entering the electrode assembly.

In the embodiment of the present specification, the first and second non-coated portions extend in opposite directions in the height direction of the secondary battery (the direction parallel to the Z-axis). The first non-coated portion extends toward a closed portion of the battery can, and the second non-coated portion extends toward an opened portion of the battery can.

In the embodiment of the present specification, the first electrode may be a negative electrode, and the second electrode may be a positive electrode.

In the embodiment of the present specification, the first electrode may be a positive electrode, and the second electrode may be a negative electrode.

In the embodiment of the present specification, any active material publicly known in the art may be used, without limitation, as the positive electrode active material applied onto the positive electrode and the negative electrode active material applied onto the negative electrode.

As an example, the positive electrode active material may include an alkaline metal compound expressed by a general chemical formula $A[A_xM_y]O_{2+z}$ (A includes one or more elements among Li, Na, and K, M includes one or more elements selected from Ni, Co, Mn, Ca, Mg, Ti, Si, Fe, Mo, V, Zr, Zn, Cu, Al, Mo, Sc, Zr, Ru, and Cr, $x \geq 0$, $1 \leq x+y \leq 2$, and $-0.1 \leq z \leq 2$ in which stoichiometric coefficients x, y, and z are selected so that the compound is kept neutral electrically).

As another example, the positive electrode active material may be an alkaline metal compound $xLiM^1O_{2\_}(1-x)Li_2M_2O_3$ ($M^1$ includes one or more elements having average oxidation state 3, $M^2$ includes one or more elements having average oxidation state 4, and $0 \leq x \leq 1$) disclosed in U.S. Pat. Nos. 6,677,082, 6,680,143, and the like.

As still another example, the positive electrode active material may be lithium metal phosphate expressed by a general chemical formula $Li_aM^1_xFe_{1-x}M^2_yP_{1-y}M^3_zO_{4-z}$ ($M^1$ includes one or more elements selected from Ti, Si, Mn, Co, Fe, V, Cr, Mo, Ni, Nd, Mg, and Al, $M^2$ includes one or more elements selected from Ti, Si, Mn, Co, Fe, V, Cr, Mo, Ni, Nd, Mg, Al, As, Sb, Si, Ge, V, and S, $M^3$ includes halogen family elements selectively including F, $0<a \leq 2$, $0 \leq x \leq 1$, $0 \leq y<1$, and $0 \leq z<1$ in which stoichiometric coefficients a, x, y, and z are selected so that the compound is kept neutral electrically) or $Li_3M_2(PO_4)_3$ (M includes one or more elements selected from Ti, Si, Mn, Fe, Co, V, Cr, Mo, Ni, Mg, and Al).

In particular, the positive electrode active material may include primary particles and/or secondary particles in which the primary particles are agglomerated.

As an example, carbon materials, lithium metal or lithium metal compound, silicon or silicon compound, tin or tin compound, and the like may be used as the negative electrode active material. A metal oxide such as $TiO_2$ and $SnO_2$ having electric potential of less than 2 V may also be used as the negative electrode active material. Both low-crystalline carbon and/or high-crystalline carbon may be used as the carbon material.

In the embodiment of the present specification, a porous polymer film, for example, a porous polymer film made of polyolefin-based polymer such as ethylene homopolymer, propylene homopolymer, ethylene/butene copolymer, ethylene/hexene copolymer, or ethylene/methacrylate copolymer may be used singly as the separator or a stack of the porous polymer films may be used as the separator. As another example, a typical porous non-woven fabric, for example, a non-woven fabric made of high-melting point fiberglass, polyethylene terephthalate fiber, or the like may be used as the separator.

At least one surface of the separator may include a coating layer containing inorganic particles. In addition, the separator itself may be a coating layer containing inorganic particles. The particles constituting the coating layer may be coupled by a binder so that an interstitial volume is present between the adjacent particles.

The inorganic particles may be made of inorganic substance with permittivity of 5 or more. As a non-restrictive example, the inorganic particle may include one or more substances selected from a group consisting of $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$(PMN-PT), $BaTiO_3$, hafnia($HfO_2$), $SrTiO_3$, $TiO_2$, $Al_2O_3$, $ZrO_2$, $SnO_2$, $CeO_2$, MgO, CaO, ZnO, and $Y_2O_3$.

The electrolyte may be a salt having a structure such as $A^+B^-$. In this case, $A^+$ includes ions including alkaline metal cations such as $Li^+$, $Na^+$, and $K^+$ or a combination thereof. Further, B– includes one or more anions selected from a group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^{--}$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In addition, the electrolyte may be dissolved in an organic solvent and used. Propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or a mixture thereof may be used as the organic solvent.

The secondary battery according to the present specification may further include the battery can configured to accommodate the electrode assembly and including an opening portion; the cap plate configured to seal the opening portion of the battery can; and the electrode terminal welded and coupled to the first welding portion of the current collecting plate and coupled to the battery can by riveting.

The secondary battery according to the embodiment of the present specification includes a cylindrical battery can 51 configured to accommodate an electrode assembly 71 and electrically connected to a non-coated portion 72 of a second electrode. In particular, the battery can 51 is opened at one side (the lower side). In addition, a bottom 52 of the battery can 51 has a structure in which an electrode terminal 50 is riveted into a through-hole 53 through a caulking process.

In the embodiment of the present specification, the secondary battery may include a gasket interposed between the electrode terminal and the through-hole.

The secondary battery 70 according to the embodiment of the present specification may include a sealing body 74 configured to seal an opening end of the battery can 51 so as to be insulated from the battery can 51. In particular, the sealing body 74 may include a cap plate **74*a* having no polarity, and a sealing gasket 74*b* interposed between an edge of the cap plate 74*a* and the opening end of the battery can 51**.

In the present specification, the cap plate **74*a* may be made of a conductive metallic material such as aluminum, steel, or nickel. In addition, the sealing gasket 74*b* may be made of polypropylene, polybutylene terephthalate, polyfluorinated ethylene, or the like having insulation and elasticity. However, the present invention is not limited by the material of the cap plate 74*a* and the material of the sealing gasket 74*b***.

In the embodiment of the present specification, the cap plate **74*a* may include a vent notch 77 that bursts when a pressure in the battery can 51 exceeds a critical value. The vent notches 77 may be formed at two opposite surfaces of the cap plate 74*a*. The vent notch 77 may be formed in the surface of the cap plate 74*a*** while having a continuous or discontinuous circular pattern, a straight pattern, or other patterns.

In the embodiment of the present specification, the battery can 51 may include a crimping portion 75 extending and bent toward the inside of the battery can 51 and configured to surround and fix the edge of the cap plate **74*a* together with the sealing gasket 74*b* in order to fix the sealing body 74**.

In the embodiment of the present specification, the battery can 51 may also include a beading portion 76 press-fitted into the battery can 51 in a region adjacent to the opening end. The beading portion 76 supports an edge of the sealing body 74, particularly, an outer periphery surface of the sealing gasket **74*b* when the sealing body 74 is fixed by the crimping portion 75**.

In the embodiment of the present specification, the electrode terminal may be made of a metallic material having conductivity. The electrode terminal may be made of aluminum (Al).

In the embodiment of the present specification, the secondary battery may further include a second current collecting plate 78 welded to the non-coated portion 72 of the second electrode. The second current collecting plate 78 is made of a conductive metallic material such as aluminum, steel, or nickel.

In the embodiment of the present specification, at least a part 78*a* of an edge of the second current collecting plate 78, which is not in contact with the non-coated portion 72 of the second electrode, may be interposed between the beading portion 76 and the sealing gasket 74*b* and fixed by the crimping portion 75.

Selectively, at least a part 78*a* of the edge of the second current collecting plate 78 may be fixed, by welding, to an inner peripheral surface 76*a* of the beading portion 76 adjacent to the crimping portion 75.

In the embodiment of the present specification, an insulator may be provided between the current collecting plate and an inner surface of the battery can. The insulator prevents the contact between the current collecting plate and the battery can. The insulator may also be interposed between an upper end of the outer peripheral surface of the electrode assembly and the inner surface of the battery can. That is, the insulator may also be interposed between the non-coated portion of the first electrode and an inner surface of a sidewall portion of the battery can. This is to prevent the contact between the inner peripheral surface of the battery can and the non-coated portion of the first electrode extending toward the closed portion of the battery can.

In the embodiment of the present specification, the non-coated portions 72 and 73 of the first electrode and/or the second electrode are bent from the outer periphery toward the core of the electrode assembly 71, such that the bent surfaces may be formed at the upper and lower sides of the electrode assembly 71. In addition, the second current collecting plate 78 may be welded to the bent surface formed by bending the non-coated portion 72 of the second electrode, and the first current collecting plate 79 may be welded to the bent surface formed by bending the non-coated portion 73 of the first electrode.

To mitigate stress occurring at the time of bending the non-coated portions 72 and 73, the first electrode and/or the second electrode may have the improved structure different from the structure of the electrode illustrated in FIG. 1. FIG. 11 is a top plan view exemplarily illustrating a structure of an electrode 90 according to the exemplary embodiment of the present invention.

Referring to FIG. 11, the electrode 90 includes the current collector 91 having a sheet shape and provided in the form of a foil made of a conductive material, the active material layer 92 formed on at least one surface of the current collector 91, and the non-coated portion 93 disposed at a long side end of the current collector 91, and the non-coated portion 93 is not coated with an active material.

In particular, the non-coated portion 93 may include a plurality of notched segmental pieces 93*a*. The plurality of segmental pieces 93*a* constitutes a plurality of groups, and the segmental pieces 93*a* included in each of the groups may have the same height (length in a Y direction), and/or the same width (length in a Z direction), and/or the same spacing pitch. The number of segmental pieces 93*a* included in each of the groups may further increase or decrease than illustrated. The segmental piece 93*a* may have a trapezoidal shape and be modified in a quadrangular, parallelogrammatic, semi-circular, or semi-elliptical shape. In particular, the height of the segmental piece 93*a* may increase in a stepwise manner in the direction from the core to the outer periphery. In addition, a core side non-coated portion 93' disposed adjacent to the core may not include the segmental piece 93*a*, and the core side non-coated portion 93' may have a smaller height than other non-coated portion regions.

In the embodiment of the present specification, the electrode 90 may include an insulating coating layer 94 configured to cover a boundary between the active material layer 92 and the non-coated portion 93. The insulating coating layer 94 contains polymer resin with insulation and may further selectively include an inorganic filler. The insulating coating layer 94 serves to prevent an end of the active material layer 92 from coming into contact with an active material layer having an opposite polarity and facing the active material layer 92 through the separator. The insulating coating layer 94 serves to structurally support the bent portion of the segmental piece 93*a*. To this end, at least a part of the insulating coating layer 94 may be exposed to the outside from the separator when the electrode 90 is wound as the electrode assembly.

FIG. 12 is a cross-sectional view taken in the longitudinal direction Y and illustrating the electrode assembly 100 according to the embodiment of the present invention in which a segmental structure of the non-coated portion of the electrode 90 is applied to first and second electrodes.

Referring to FIG. 12, the electrode assembly 100 may be manufactured by the winding method described with reference to FIG. 2. For the convenience of description, the protruding structure of the non-coated portions 72 and 73 extending to the outside of the separator is illustrated in detail, but the illustration of the structure in which the first electrode, the second electrode, and the separator are wound will be omitted. The non-coated portion 72 protruding downward extends from the first electrode, and the non-coated portion 73 protruding upward extends from the second electrode. The pattern in which heights of the non-coated portions 72 and 73 are changed is schematically illustrated.

That is, the heights of the non-coated portions 72 and 73 may be irregularly changed depending on positions at which cross-sections are formed. For example, when a side portion of the trapezoidal segmental piece 93*a* is cut, a height of the non-coated portion is smaller than a height of the segmental piece 93*a* in a cross-sectional view. Therefore, it should be understood that the heights of the non-coated portions 72 and 73 illustrated in the drawing illustrating a cross-section of the electrode assembly 100 correspond to an average height of the non-coated portion included in the respective winding turns.

As illustrated in FIG. 12, the non-coated portions 72 and 73 may be bent toward the core from the outer periphery of the electrode assembly 100. FIG. 12 illustrates bent parts 101 indicated by boxed with dash-dotted lines. When the non-coated portions 72 and 73 are bent, the segmental pieces radially adjacent to one another are superimposed in multiple layers, such that bent surfaces 102 are formed at upper and lower portions of the electrode assembly 100. In this case, the core side non-coated portion (93' in FIG. 11) has a small height and thus is not bent. A height h of the segmental piece, which is bent at the innermost side, is equal to or smaller than a radial length r of a winding region formed by the core side non-coated portion 93' having no segmental piece structure. Therefore, a cavity 80 positioned at the core of the electrode assembly 100 is not closed by the bent segmental pieces. When the cavity 80 is not closed, there is no difficulty in the process of injecting the electrolyte, and efficiency in injecting the electrolyte is improved.

The cap plate 74*a* of the sealing body 74 of the secondary battery 70 according to the embodiment of the present invention has no polarity. Instead, the second current collecting plate 78 is connected to the sidewall of the battery can 51, such that the outer surface 52*a* of the bottom 52 of the battery can 51 has a polarity opposite to the polarity of the electrode terminal 50. Therefore, wiring, such as busbar connection, may be performed above the secondary battery 70 by using the electrode terminal 50 and the outer surface 52*a* of the bottom 52 of the battery can 51 at the time of connecting a plurality of cells in series and/or parallel. Therefore, it is possible to increase the number of cells to be mounted in the same space and increase energy density.

In the embodiment of the present specification, the secondary battery may include the electrode terminal riveted to the bottom of the battery can.

FIG. 5 is a cross-sectional view illustrating a riveting structure of the electrode terminal 50 according to the embodiment of the present invention, and FIG. 6 is an enlarged cross-sectional view of a part indicated by the dash-dotted circle.

Referring to FIGS. 5 and 6, the riveting structure of the electrode terminal 50 according to the embodiment may include the cylindrical battery can 51 opened at one side thereof, the electrode terminal 50 riveted through the through-hole 53 formed in the bottom 52 of the battery can 51, and a riveting gasket 54 interposed between the electrode terminal 50 and the through-hole 53.

The battery can 51 may be made of a conductive metallic material. For example, the battery can 51 may be made of steel, but the present invention is not limited thereto.

The electrode terminal 50 is made of a conductive metallic material. For example, the electrode terminal 50 may be made of aluminum, but the present invention is not limited thereto.

In the embodiment of the present specification, the riveting gasket 54 may be made of polymer resin having insulation and elasticity. For example, the riveting gasket 54 may be made of polypropylene, polybutylene terephthalate, polyfluorinated ethylene, or the like, but the present invention is not limited thereto.

In the embodiment of the present specification, the electrode terminal 50 may include: a body portion 50*a* inserted into the through-hole 53; an outer flange portion 50*b* extending along an outer surface 52*a* from a periphery of one side of the body portion 50*a* exposed through the outer surface 52*a* of the bottom 52 of the battery can 51; an inner flange portion 50*c* extending toward an inner surface 52*b* from a periphery of the other side of the body portion 50*a* exposed through the inner surface 52*b* of the bottom 52 of the battery can 51; and a flat portion 50*d* provided inside the inner flange portion 50*c*.

In particular, the flat portion 50*d* may be parallel to the inner surface 52*b* of the bottom 52 of the battery can 51. In this case, the term 'parallel' means being substantially parallel when observed with the naked eye.

According to one aspect, an angle θ between the inner flange portion 50*c* and the inner surface 52*b* of the bottom 52 of the battery can 51 may be 0 to 60 degrees. The magnitude of the angle is determined depending on caulking strength in a case in which the electrode terminal 50 is installed in the through-hole 53 of the battery can 51 through a caulking process. For example, the angle θ may decrease to 0 degree as the caulking strength increases. If the angle exceeds 60 degrees, the sealing effect of the riveting gasket 54 may deteriorate.

In the embodiment of the present specification, a recessed portion 55 may be provided between the inner flange portion 50*c* and the flat portion 50*d*. The recessed portion 55 may have a cross-sectional structure of an asymmetric groove. For example, the asymmetric groove may have an approximately V shape. The asymmetric groove may include a sidewall 55*a* of the flat portion 50*d*, and an inclined surface 55*b* of the inner flange portion 50*c* connected to an end of the sidewall 55*a*. The sidewall 55*a* may be substantially perpendicular to the inner surface 52*b* of the bottom 52 of the battery can 51. The term 'perpendicular' means being substantially perpendicular when observed with the naked eye. The recessed portion 55 is made by a shape of a caulking jig when the electrode terminal 50 is installed in the through-hole 53 of the battery can 51 through the caulking process. In particular, a thickness of the inner flange portion 50*c* may decrease as a distance from the body portion 50*a* of the electrode terminal 50 increases.

In the embodiment of the present specification, the riveting gasket 54 may include: an outer gasket 54*a* interposed between the outer flange portion 50*b* and the outer surface 52*a* of the bottom 52 of the battery can 51; and an inner gasket 54*b* interposed between the inner flange portion 50*c* and the inner surface 52*b* of the bottom 52 of the battery can 51.

The thickness of the outer gasket 54*a* and the thickness of the inner gasket 54*b* may vary depending on positions thereof. In particular, a region of the inner gasket 54*b*, which is interposed between the inner flange portion 50*c* and the inner edge 56 of the through-hole 53 connected to the inner surface 52*b* of the bottom 52 of the battery can 51 may have a relatively small thickness. In particular, there may be a minimum thickness point in the gasket region interposed between the inner flange portion 50*c* and the inner edge 56 of the through-hole 53. In addition, the inner edge 56 of the through-hole 53 may include a facing surface 57 facing the inner flange portion 50*c*.

Meanwhile, upper and lower ends of the inner wall of the through-hole 53 perpendicular to the bottom 52 of the battery can 51 are chamfered (corner-cutting) to form tapered surfaces toward the electrode terminal 50. However, the upper end and/or the lower end of the inner wall of the through-hole 53 may be modified to a soft curved surface having a curvature. In this case, it is possible to further mitigate stress applied to the gasket 54 at the periphery of the upper end and/or the lower end of the inner wall of the through-hole 53.

In particular, the inner gasket 54*b* may extend to be longer than the inner flange portion 50*c* while defining an angle of 0 to 60 degrees with the inner surface 52*b* of the bottom 52 of the battery can 51.

As another example, based on the inner surface 52*b* of the bottom 52 of the battery can 51, a height H1 of the flat portion 50*d* may be equal to or larger than a height H2 of an end of the inner gasket 54*b*.

In addition, based on the inner surface 52*b* of the bottom 52 of the battery can 51, the height H1 of the flat portion 50*d* may be equal to or larger than a height H3 of an end of the inner flange portion 50*c*. When the height parameters H1, H2, and H3 satisfy the condition, it is possible to prevent the inner flange portion 50*c* and the inner gasket 54*b* from interfering with another component.

In the embodiment of the present specification, a radius R1 from a center of the body portion 50*a* of the electrode terminal 50 to an edge of the outer flange portion 50*b* may be 10 to 60% of a radius R2 of the bottom 52 of the battery can 51.

As R1 decreases, a welding space becomes insufficient at the time of welding an electric wiring component (busbar) to the electrode terminal 50. In addition, when the R1 increases, a welding space decreases at the time of welding the electric wiring component (busbar) to the outer surface 52*a* of the bottom 52 of the battery can 51 except for the electrode terminal 50. The welding space for the electrode terminal 50 and the outer surface of the bottom 52 of the battery can 51 may be appropriately ensured by adjusting a ratio R1/R2 between 10 and 60%.

In the embodiment of the present specification, a radius R3 from the center of the body portion 50*a* of the electrode terminal 50 to an edge of the flat portion 50*d* may be 4 to 30% of the radius R2 of the bottom 52 of the battery can 51. As R3 decreases, a welding space becomes insufficient at the time of welding the current collecting plate (see 79 in FIG. 7) to the flat portion 50*d* of the electrode terminal 50, and a welding area of the electrode terminal 50 decreases, which may increase contact resistance. In addition, R3 needs to be smaller than R1. When R3 increases, the thickness of the inner flange portion 50*c* decreases, and a force of the inner flange portion 50*c* compressing the riveting gasket 54 decreases, which degrades the sealing ability of the riveting gasket 54.

When R3/R2 is adjusted between 4 and 30%, the welding area of the current collecting plate (79 in FIG. 7) and the flat portion 50*d* of the electrode terminal 50 may be sufficiently ensured. Therefore, the welding process may be easily performed, the contact resistance of the welding region may be reduced, and the degradation of the sealing ability of the riveting gasket 54 may be prevented.

According to the embodiment of the present specification, the current collecting plate and the flat portion of the electrode terminal may be electrically connected. Specifically, the current collecting plate and the flat portion may be directly connected by a welding process or electrically connected by means of an electrode tab, a lead, or the like. In this case, the welding process is not limited as long as the welding process is a method typically performed in the art.

According to the embodiment of the present invention, the riveting structure of the electrode terminal 50 may be formed by a caulking jig configured to move upward and downward. First, a preform (not illustrated) of the electrode terminal 50 is inserted by interposing the riveting gasket 54 into the through-hole 53 formed in the bottom 52 of the battery can 51. The preform refers to an electrode terminal before being riveted.

Next, the caulking jig is inserted into an internal space of the battery can 51. The caulking jig has a groove and a protrusion corresponding to a final shape of the electrode terminal 50 and formed on a surface facing the preform in order to form the electrode terminal 50 by riveting the preform.

Next, the caulking jig is moved downward, and pressing forming is performed on an upper portion of the preform, such that the preform is deformed to the riveted electrode terminal 50.

During the process of pressing the preform with the caulking jig, the outer gasket 54*a* interposed between the outer flange portion 50*b* and the outer surface 52*a* of the bottom 52 of the battery can 51 is elastically compressed, and a thickness of the outer gasket 54*a* is reduced. In addition, a portion of the inner gasket 54*b* interposed between the preform and the inner edge 56 of the through-hole 53 is elastically compressed by the inner flange portion 50*c* and has a smaller thickness than other regions. In particular, a region in which the thickness of the inner gasket 54*b* is concentratedly reduced is indicated by the dotted circle in FIG. 6. Therefore, sealing performance and sealability between the battery can 51 and the riveted electrode terminal 50 are remarkably improved.

In particular, the riveting gasket 54 may be sufficiently compressed to ensure desired sealing strength without being physically damaged during the process of riveting the preform.

For example, in a case in which the riveting gasket 54 is made of polybutylene terephthalate, compressibility of the riveting gasket 54 may be 50% or more at a point at which the riveting gasket 54 is compressed to a minimum thickness. The compressibility is a ratio of change in thickness between before and after compression with respect to the thickness before compression. As another example, in a case in which the riveting gasket 54 is made of polyfluoroethylene, compressibility of the riveting gasket 54 may be 60% or more at the point at which the riveting gasket 54 is compressed to the minimum thickness.

As another example, in a case in which the riveting gasket 54 is made of polypropylene, compressibility of the riveting gasket 54 may be 60% or more at the point at which the riveting gasket 54 is compressed to the minimum thickness.

In particular, pressing forming may be performed in a stepwise manner on an upper portion of the preform by moving the caulking jig upward and downward at least twice. That is, the preform may be deformed multiple times by the pressing forming performed in a stepwise manner. In this case, a pressure applied to the caulking jig may increase in a stepwise manner. The stress applied to the preform is dispersed multiple times, which makes it possible to prevent damage to the riveting gasket 54 during the caulking process. In particular, the damage to the gasket is minimized when the portion of the inner gasket 54*b* interposed between the preform and the inner edge 56 of the through-hole 53 is concentratedly compressed by the inner flange portion 50*c*.

When the pressing forming of the preform using the caulking jig is completed and then the caulking jig is separated from the battery can 51, the riveting structure of the electrode terminal 50 according to the embodiment of the present invention may be obtained, as illustrated in FIG. 6.

According to the embodiment, the caulking jig performs the pressing forming on the upper portion of the preform while moving upward and downward in the battery can 51. In some instances, a rotary jig used in the related art may be used to perform the pressing forming on the preform.

However, the rotary jig rotates in a state of being inclined at a predetermined angle with respect to a center axis of the battery can 51. Therefore, the rotary jig having a large rotation radius may interfere with an inner wall of the battery can 51. In addition, as a depth of the battery can 51 increases, a length of the rotary jig also increases to that extent. In this case, as a rotation radius of the rotary jig end increases, the pressing forming may not be properly performed on the preform.

The pressing forming using the caulking jig is more effective than the method using the rotary jig.

The riveting structure of the electrode terminal 50 according to the embodiment of the present invention may be applied to the cylindrical secondary battery.

In the embodiment of the present specification, the secondary battery may be a cylindrical secondary battery having a ratio of a form factor larger than 0.4 (the ratio of the form factor is defined as a value made by dividing a diameter of the cylindrical battery by a height of the cylindrical battery, i.e., a ratio of a diameter (to a height H). In this case, the form factor means a value indicating the diameter and the height of the cylindrical secondary battery.

In the related art, batteries having the ratio of the form factor of approximately 0.4 or less are used. That is, in the related art, 18650 cell, 21700 cell, and the like are used, for example. In the case of 18650 cell, a diameter thereof is approximately 18 mm, a height thereof is approximately 65 mm, and a ratio of the form factor thereof is approximately 0.277. In the case of 21700 cell, a diameter thereof is approximately 21 mm, a height thereof is approximately 70 mm, and a ratio of the form factor thereof is approximately 0.300.

The cylindrical secondary battery according to the embodiment of the present specification may be 46110 cell, 48750 cell, 48110 cell, 48800 cell, or 46800 cell. In the numerical value indicating the form factor, the first two numbers indicate a diameter of the cell, the next two numbers indicate a height of the cell, and the final number 0 indicates that a cross-section of the cell is circular.

The secondary battery according to the embodiment of the present specification may be a cylindrical secondary battery that is a cylindrical cell and has a diameter of 46 mm, a height of 110 mm, and a ratio of the form factor of 0.418.

The secondary battery according to the embodiment of the present specification may be a cylindrical secondary battery that is a cylindrical cell and has a diameter of 48 mm, a height of 75 mm, and a ratio of the form factor of 0.640.

The secondary battery according to the embodiment of the present specification may be a cylindrical secondary battery that is a cylindrical cell and has a diameter of 48 mm, a height of 110 mm, and a ratio of the form factor of 0.436.

The secondary battery according to the embodiment of the present specification may be a cylindrical secondary battery that is a cylindrical cell and has a diameter of 48 mm, a height of 80 mm, and a ratio of the form factor of 0.600.

The secondary battery according to the embodiment of the present specification may be a cylindrical secondary battery that is a cylindrical cell and has a diameter of 46 mm, a height of 80 mm, and a ratio of the form factor of 0.575.

The present specification provides a current collecting plate including: the electrode assembly made by stacking and winding the first electrode, the separator, and the second electrode, the first electrode including the first electrode current collector and the electrode active material layer provided on the first electrode current collector, in which the non-coated portion of the first electrode, on which the electrode active material layer is not provided, is provided at the long side end based on the winding direction of the current collector; the battery can configured to accommodate the electrode assembly and including the opening portion; the cap plate configured to seal the opening portion of the battery can; and a current collecting plate configured to be applied to a secondary battery including an electrode terminal riveted to the battery can, the current collecting plate being provided at one end of the electrode assembly at which the non-coated portion of the first electrode is exposed and including the central portion corresponding to the core of the electrode assembly, in which the central portion includes the first welding portion having a smaller thickness than the remaining portion of the current collecting plate. The components of the current collecting plate are identical to the components described above.

The secondary battery according to the embodiment of the present specification may be used to manufacture a battery pack. FIG. 14 is a view schematically illustrating a configuration of a battery pack according to an embodiment of the present invention.

Referring to FIG. 14, a battery pack 200 according to the embodiment of the present invention includes an assembly to which a secondary battery cell 201 is electrically connected, and a pack housing 202 configured to accommodate the assembly. The cylindrical secondary battery cell 201 is the battery cell according to the above-mentioned embodiment. For convenience of illustration, components such as busbars for electrical connection between the cylindrical battery cells 201, a cooling unit, and an external terminal are omitted from the drawings.

The battery pack 200 may be mounted on a vehicle. For example, the vehicle may be an electric vehicle, a hybrid vehicle, or a plug-in hybrid vehicle. The vehicle may be a four-wheel vehicle or a two-wheel vehicle. FIG. 15 is a view for explaining a vehicle including the battery pack 200 illustrated in FIG. 14.

Referring to FIG. 15, a vehicle V according to the embodiment of the present specification includes the battery pack 200 according to the embodiment of the present specification. The vehicle V operates by receiving electric power from the battery pack 200 according to the embodiment of the present invention.

The present invention has been described with reference to the limited embodiments and the drawings, but the present invention is not limited thereto. The described embodiments may be changed or modified by those skilled in the art to which the present invention pertains within the technical spirit of the present invention and within the scope equivalent to the appended claims.

The invention claimed is:

1. A secondary battery comprising:

an electrode assembly in which first and second electrodes and a separator provided between the first and second electrodes are wound, the first and second electrodes each comprising a non-coated portion disposed at a long side end thereof, exposed to an outside of the separator, and having no active material applied thereto; and a current collecting plate provided at one end of the electrode assembly at which the non-coated portion of the first electrode is exposed, the current collecting plate comprising a central portion corresponding to a core of the electrode assembly, and a peripheral portion provided around the central portion and configured to adjoin one end of the electrode assembly, wherein the peripheral portion comprises one or more first through-holes penetrated by at least a part of the non-coated portion of the first electrode, wherein the at least the part of the non-coated portion of the first electrode is a protruding portion, and wherein the non-coated portion further includes a debossed portion recessed by cutting the non-coated portion such that an overall length of the debossed portion is less than an overall length of the protruding portion so that the protruding portion protrudes.

2. The secondary battery of claim 1, wherein the central portion of the current collecting plate further comprises a center hole provided in a portion corresponding to the core of the electrode assembly.

3. The secondary battery of claim 1, wherein the non-coated portion of the first electrode exposed to the outside through the first through-holes of the current collecting plate is bent one or more times in a direction toward the core of the electrode assembly.

4. The secondary battery of claim 1, wherein the one or more first through-holes comprise two or more first through-holes spaced apart from one another in a winding direction of the electrode assembly.

5. The secondary battery of claim 1, wherein the peripheral portion of the current collecting plate comprises one or more first through-hole groups, each of the first through-hole groups comprising two or more first through-holes of the one or more first through-holes spaced apart from one another in a direction from the central portion toward one outer peripheral portion.

6. The secondary battery of claim 5, wherein each of the first through-hole groups comprises two to six first through-holes of the one or more first through-holes spaced apart from one another in the direction from the central portion toward one outer peripheral portion.

7. The secondary battery of claim 5, wherein the one or more first through-hole groups comprises two to six first through-hole groups, and the first through-hole groups are disposed to be spaced apart from one another in a winding direction of the electrode assembly.

8. The secondary battery of claim 5, wherein the one or more first through-hole groups comprise two first through-hole groups, and the two first through-hole groups face each other with the central portion interposed therebetween.

9. The secondary battery of claim 5, wherein the one or more first through-hole groups comprise three to six first through-hole groups, and the first through-hole groups are disposed to be spaced apart from one another in a winding direction of the electrode assembly.

10. The secondary battery of claim 1, wherein at least one of the first through-holes adjoins an edge of the current collecting plate.

11. The secondary battery of claim 1, wherein each of the first through-holes has a slit or dot shape.

12. The secondary battery of claim 1, wherein the peripheral portion of the current collecting plate further comprises one or more second through-holes.

13. The secondary battery of claim 5, wherein the one or more first through-hole groups comprise two or more first through-holes groups, and wherein the peripheral portion of the current collecting plate further comprises one or more second through-holes, each second through-hole being provided between two adjacent first through-hole groups.

14. The secondary battery of claim 1, wherein the current collecting plate further comprises an electrode tab.

15. A battery pack comprising a plurality of secondary batteries according to claim 1.

16. A vehicle comprising at least one battery pack according to claim 15.

17. The secondary battery of claim 1, wherein the protruding portion exposed to the outside through the first through-hole is bent one or more times.

* * * * *